(12) United States Patent
Oki

(10) Patent No.: US 8,139,238 B2
(45) Date of Patent: Mar. 20, 2012

(54) PRINTING USING MULTIPLE PAPER FEEDERS

(75) Inventor: Mitsuo Oki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1309 days.

(21) Appl. No.: 11/764,776

(22) Filed: Jun. 18, 2007

(65) Prior Publication Data

US 2007/0296748 A1    Dec. 27, 2007

(30) Foreign Application Priority Data

Jun. 27, 2006  (JP) .................................. 2006-177295

(51) Int. Cl.
G06F 15/00    (2006.01)
(52) U.S. Cl. ........ 358/1.13; 358/498; 358/1.14; 399/80; 399/81; 399/83; 347/14; 271/9.01
(58) Field of Classification Search ................. 358/1.15, 358/474, 498, 367, 369, 1.13, 1.19, 1.14, 358/67; 271/9.01, 9.04–9.07; 347/14; 399/79–83
See application file for complete search history.

(56) References Cited

U.S. PATENT DOCUMENTS

| | | | | |
|---|---|---|---|---|
| 5,172,178 | A * | 12/1992 | Oushiden et al. ................ | 399/86 |
| 5,229,814 | A * | 7/1993 | Hube et al. ...................... | 399/14 |
| 5,500,717 | A * | 3/1996 | Altrieth, III .................... | 399/83 |
| 5,614,993 | A * | 3/1997 | Smith et al. .................... | 399/81 |
| 5,835,820 | A * | 11/1998 | Martin et al. ................... | 399/85 |
| 5,890,708 | A * | 4/1999 | Song .......................... | 271/10.03 |
| 6,233,414 | B1 * | 5/2001 | Farrell ........................... | 399/81 |
| 6,304,732 | B1 * | 10/2001 | Myers et al. ..................... | 399/81 |
| 6,507,716 | B2 * | 1/2003 | Nomura et al. .................. | 399/80 |
| 6,647,222 | B1 * | 11/2003 | Digby et al. ..................... | 399/81 |
| 6,682,236 | B2 * | 1/2004 | Higuchi ......................... | 400/582 |
| 6,698,950 | B2 * | 3/2004 | Nishii ............................ | 400/63 |
| 6,768,883 | B2 * | 7/2004 | Wiegand et al. ................ | 399/82 |
| 6,817,794 | B2 * | 11/2004 | Kakutani ....................... | 400/582 |

(Continued)

FOREIGN PATENT DOCUMENTS

JP    11320854    11/1999

(Continued)

OTHER PUBLICATIONS

Japanese Office Action dated May 20, 2011 concerning Japanese Patent Application No. 2006-177295.

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

A data processing apparatus with a plurality of paper feeders includes a job generation unit which generates a print job containing current print settings as a target print job, a history obtaining unit which obtains, among print settings contained in a print job output before the target print job, a paper setting associated with a paper feeder as history information, a history determination unit which determines whether a paper setting which is contained in the history information and corresponds to a paper setting contained in the target print job is associated with a paper feeder different from a paper feeder designated by print settings contained in the target print job, and a job control unit which stops or continues a print process in accordance with a user instruction when the history determination unit determines that the paper setting is associated with the different paper feeder.

11 Claims, 22 Drawing Sheets

U.S. PATENT DOCUMENTS

| | | | |
|---|---|---|---|
| 6,978,096 B2 * | 12/2005 | Maeshima | 399/82 |
| 7,114,863 B2 * | 10/2006 | Heiney et al. | 400/76 |
| 7,151,610 B2 * | 12/2006 | Nagaso | 358/1.13 |
| 7,221,885 B2 * | 5/2007 | Sato | 399/81 |
| 7,826,073 B2 * | 11/2010 | Park et al. | 358/1.1 |
| 7,913,168 B2 * | 3/2011 | Hoshino et al. | 715/273 |
| 2002/0012135 A1 * | 1/2002 | Nagaso | 358/400 |
| 2002/0035941 A1 * | 3/2002 | Nakao | 101/484 |
| 2003/0215252 A1 * | 11/2003 | Yokobori et al. | 399/45 |
| 2005/0105146 A1 * | 5/2005 | Tanaka | 358/498 |
| 2008/0259386 A1 * | 10/2008 | Fujino | 358/1.15 |
| 2009/0262385 A1 * | 10/2009 | Dantwala | 358/1.15 |

FOREIGN PATENT DOCUMENTS

| | | |
|---|---|---|
| JP | 2002-234664 A | 8/2002 |
| JP | 2002-351263 A | 12/2002 |
| JP | 2005-062916 A | 3/2005 |

* cited by examiner

FIG. 7A

| PAPER FEED PORT | PREVIOUS PAPER SIZE | PREVIOUS PAPER TYPE | PREVIOUS PRINT USER NAME |
|---|---|---|---|
| AUTO SHEET FEEDER | L SIZE | PHOTO PAPER | USER A |
| UPPER CASSETTE | B5 | NORMAL PAPER | USER B |
| LOWER CASSETTE | A4 | NORMAL PAPER | USER B |
| 701 | 702 | 703 | 704 |

FIG. 7B

| PAPER FEED PORT | PREVIOUS PAPER SIZE | PREVIOUS PAPER TYPE |
|---|---|---|
| AUTO SHEET FEEDER | L SIZE | PHOTO PAPER |
| UPPER CASSETTE | B5 | NORMAL PAPER |
| LOWER CASSETTE | A4 | NORMAL PAPER |
| 711 | 712 | 713 |

FIG. 7C

| PAPER FEED PORT | PREVIOUS PRINT USER NAME |
|---|---|
| AUTO SHEET FEEDER | USER A |
| UPPER CASSETTE | USER B |
| LOWER CASSETTE | USER B |

| POSITION OF PAPER FEED SWITCHING BUTTON IN PREVIOUS PRINTING | AUTO SHEET FEEDER |
|---|---|

801

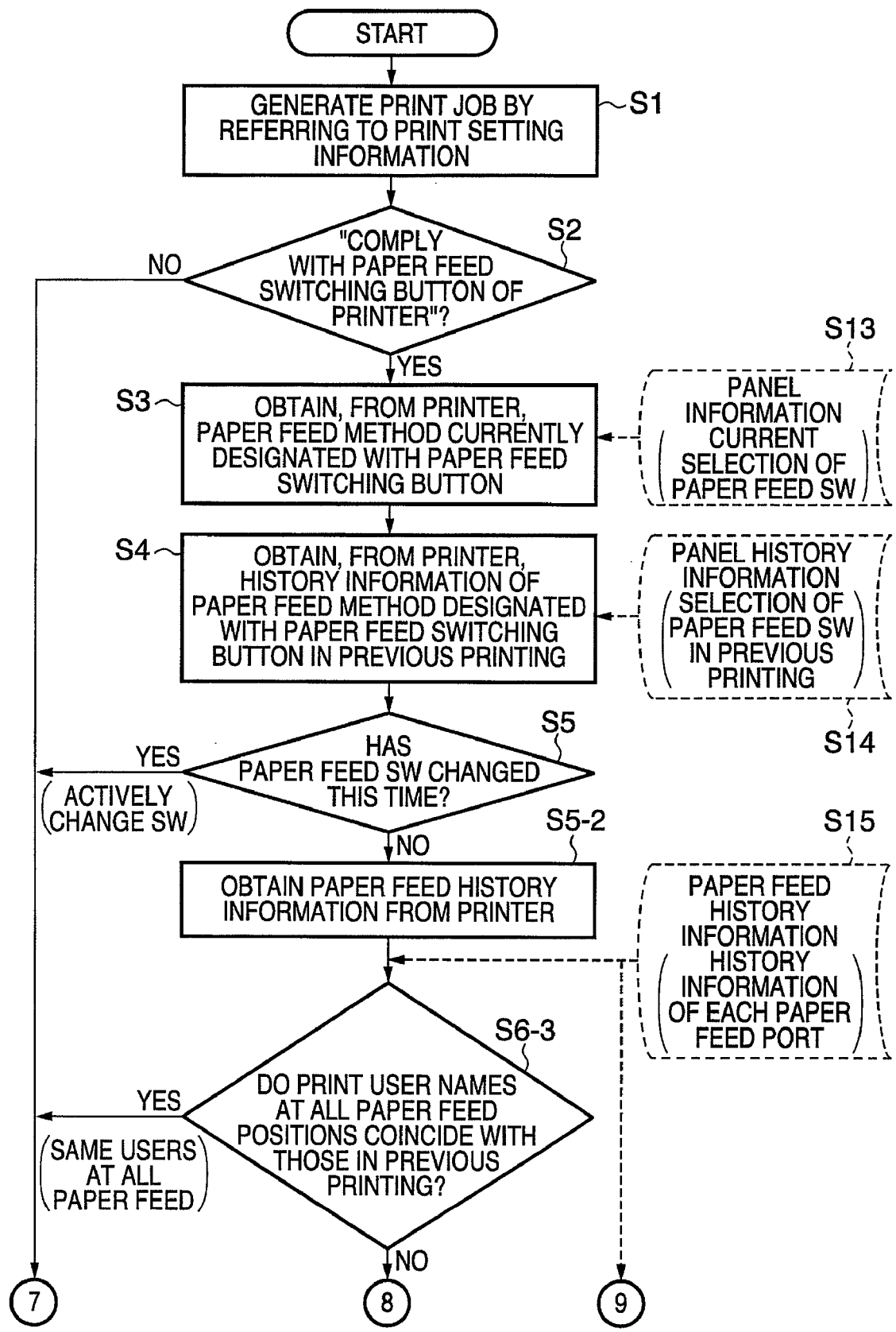

PRINTING USING MULTIPLE PAPER FEEDERS

BACKGROUND OF THE INVENTION

1. Field of the Invention

The present invention relates to a data processing apparatus, print job control method, and print data processing apparatus capable of preventing printing with unintended paper when, e.g., a printer with a plurality of paper feed units prints.

2. Description of the Related Art

A conventional printing system generally comprises a color or monochrome printer, a host computer (i.e., data processing apparatus) which controls the printer and generates print data (print job), and a communication interface which connects them.

Of printers, an inkjet printer can selectively use various print sheets in accordance with the application purpose. For example, the inkjet printer can utilize normal paper used in a copying machine or the like, coated paper prepared by coating the paper surface with silica or the like in order to suppress ink smudge and improve color development, and glossy paper used to form a photographic image such as a silver halide photograph. The inkjet printer can also print on a variety of print sheets such as an OHP film for a transparent document, and transfer paper and a back print film for iron print.

The inkjet printer can also process various print sheet sizes. For example, the inkjet printer can print on sheets of various sizes such as B5, A4, Letter, postcard size, card size, and L and 2 L photo sizes.

For this purpose, some printers have a plurality of paper feed units to supply sheets of various sizes from them. When the user selects a desired paper feed unit in printing, a printer of this type supplies paper from the selected paper feed unit to print.

For example, such a printer comprises a selection switch for selecting a paper feed unit. A choice representing a virtual paper feed unit, which is a paper feed unit indicated by the selection switch of the printer, is prepared as a choice for designating a paper feed unit on a print setting user interface provided by a host printer driver. When a print operation is done at print settings which designate a paper feed unit indicated by the switch of the printer, the printer operates to feed paper from the paper feed unit indicated by the selection switch (see, e.g., Japanese Patent Laid-Open No. 11-320854).

However, the conventional configuration suffers the following problems.

(1) A paper feed unit must be designated accurately in printing. In an environment where a plurality of users share a printer, for example, a user sets paper of a desired type and size in a proper paper feed unit. Alternatively, a paper type and size are determined for each paper feed unit. In this case, the user selects a paper feed unit loaded with desired paper with the paper feed selection switch of the printer, and executes a print job. In this operation, each user may change the selection switch to a paper feed unit for use. Before printing, the user must accurately recognize a paper feed unit selected by the paper feed selection switch, and the type and size of paper set in the paper feed unit.

(2) As a solution to problem (1), a sensor which detects the type and size of print paper may be arranged for each paper feed unit of the printer. In executing printing, whether paper can be fed is determined by comparing a type and size detected by the sensor with those of paper designated by print settings contained in a print job. According to this method, however, sensors must be arranged for all the paper feed units of the printer, increasing the printer manufacturing cost.

SUMMARY OF THE INVENTION

The present invention has been made to overcome the conventional drawbacks, and has as its object to provide a data processing apparatus, print job control method, and print data processing apparatus which solve the above-described problems. More specifically, it is an object of the present invention to output a warning, call user's attention, and prevent an error when an erroneous paper feed unit is highly likely to be designated in printing by a printer with a plurality of paper feed units.

According to an aspect of the present invention, a data processing apparatus which outputs a print job to a printing apparatus with a plurality of paper feeders comprises a job generation unit configured to generate a print job containing current print settings as a target print job, a history obtaining unit configured to obtain, among print settings contained in a print job output before the target print job, a paper setting associated with a paper feeder as history information, a history determination unit configured to determine whether a paper setting which is contained in the history information obtained by the history obtaining unit and corresponds to a paper setting contained in the target print job is associated with a paper feeder different from a paper feeder designated by print settings contained in the target print job, and a job control unit configured to stop or continue a print process in accordance with a user instruction when the history determination unit determines that the paper setting is associated with the different paper feeder.

According to this aspect, when an erroneous paper feed unit is highly likely to be designated in printing by a printer with a plurality of paper feed units, a warning can be output to call user's attention and prevent an error.

Further features of the present invention will become apparent from the following description of exemplary embodiments (with reference to the attached drawings).

BRIEF DESCRIPTION OF THE DRAWINGS

FIG. 7A is a table showing the format of paper feed history information stored in a paper feed history storage unit according to the first embodiment of the present invention;

FIG. 7B is a table showing the format of paper feed history information stored in a paper feed history storage unit according to the second embodiment of the present invention;

FIG. 7C is a table showing the format of paper feed history information stored in a paper feed history storage unit according to the third embodiment of the present invention;

FIG. 8 is a table showing the format of panel history information stored in a panel history storage unit according to the embodiment of the present invention;

FIGS. 11A and 11B are flowcharts showing a print data transfer process according to the third embodiment of the present invention;

DESCRIPTION OF THE EMBODIMENTS

The first to third embodiments will be described below. In these three embodiments, the configuration of a printing system is common though the items of paper settings (settings on paper out of print settings) held as a history by a host computer, and some process procedures to output a print job are different. First, common matters will be explained.

Figure 1:
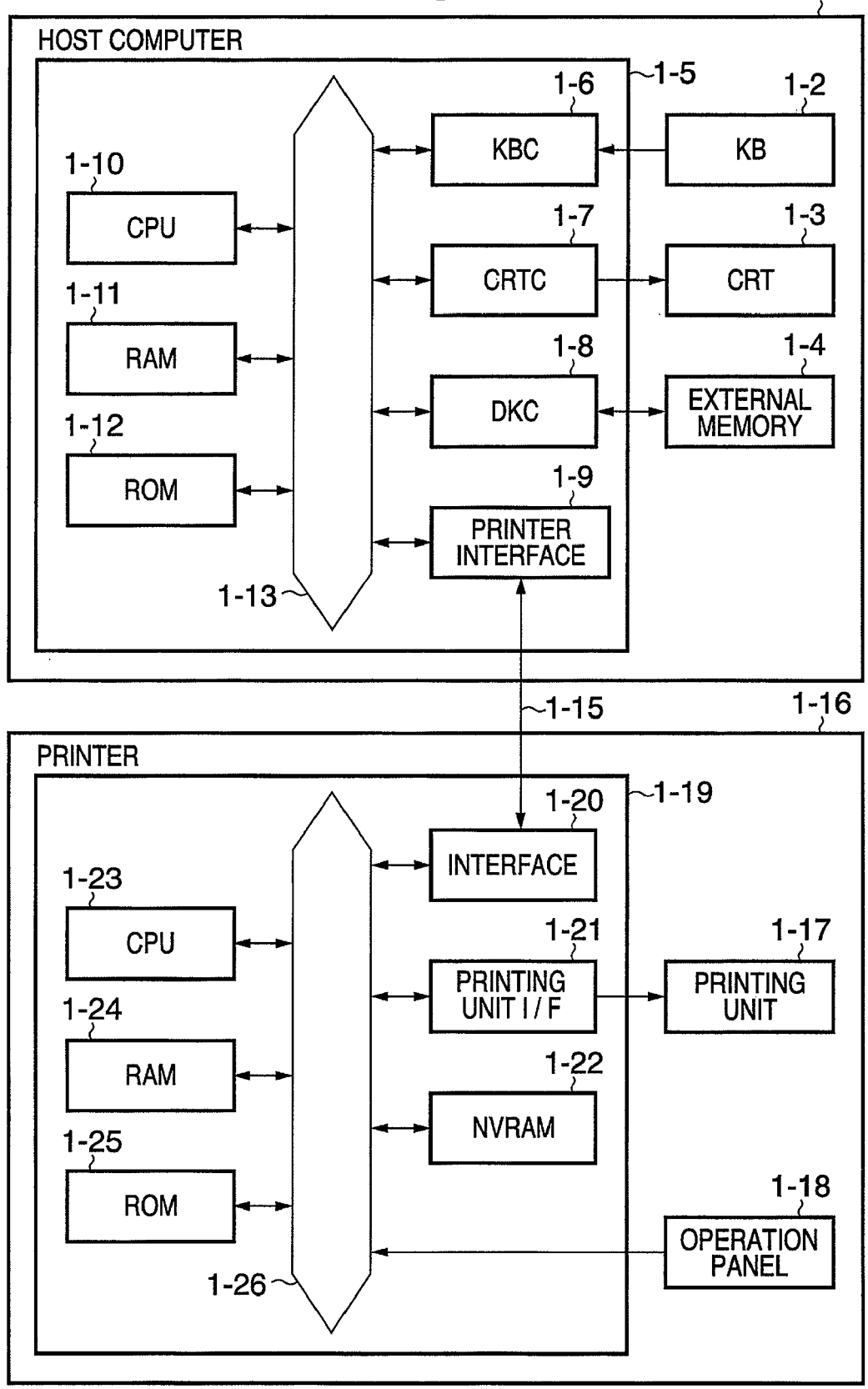
FIG. 1 is a block diagram showing the configuration of a printing system to which a data processing apparatus according to an embodiment of the present invention is applicable.

FIG. 1 is a block diagram for explaining the control configurations of a host computer and printing apparatus according to the embodiments of the present invention.

In FIG. 1, a host computer 1-1 comprises a controller 1-5, a keyboard 1-2 serving as an input device, a CRT 1-3 serving as a display device, and an external memory 1-4 such as a hard disk or optical disk. The controller 1-5 includes a CPU 1-10 which executes a process on the basis of a program (e.g., printer driver) which is stored in a ROM 1-12 and contains procedures in FIGS. 9A, 9B, 10A, 10B, 11A and 11B. The CPU 1-10 executes a program to comprehensively control devices connected to a system bus 1-13. The ROM 1-12 or the hard disk (not shown) serving as the external memory 1-4 stores control programs and the like executed by the CPU 1-10. In addition, the ROM 1-12 or the hard disk stores history information shown in FIGS. 7A, 7B, and 7C, font data used for a document process and the like, and various data (e.g., paper sizes and paper types supported by the printer, and commands for making various settings) used to perform a document process and the like.

In the controller 1-5, a RAM 1-11 is expandable by an optional RAM or the like, and functions as a main memory, work area, and the like for the CPU 1-10. A keyboard controller (KBC) 1-6 controls key inputs from the keyboard 1-2 and a pointing device (not shown). A CRT controller (CRTC) 1-7 controls display on the CRT display (CRT) 1-3. A disk controller (DKC) 1-8 controls access to the external memory 1-4, such as a hard disk (HDD) or flexible disk (FD), which stores a boot program, various applications, font data, user files, edit files, and the like. A printer interface 1-9 is connected to a printer 1-16 via a predetermined bidirectional interface (to be also simply referred to as an interface) 1-15, and executes a communication control process with the printer 1-16. The CPU 1-10 rasterizes an outline font to a display information RAM area in, e.g., the RAM 1-11, and enables WYSIWYG on the CRT 1-3. The CPU 1-10 opens various registered windows and executes various data processes on the basis of commands input with the mouse cursor (not shown) or the like on the CRT 1-3. The CPU 1-10 executes the processes of flowcharts (to be described later) by executing programs.

In a controller 1-19 of the printer 1-16, a printer CPU 1-23 comprehensively controls access to various devices connected to a system bus 1-26 on the basis of control programs and the like stored in a ROM 1-25. The printer CPU 1-23 outputs an image signal as output information to a printing unit (printer engine) 1-17 connected via a printing unit I/F 1-21. The ROM 1-25 stores an analysis program and the like for a printer setting obtaining command and the like sent from the host computer 1-1 via an interface 1-20. The CPU 1-23 can communicate with the host computer 1-1 via the interface 1-20. The CPU 1-23 can notify the host computer 1-1 of information (including print settings such as the paper size and paper type of a previously processed print job in the embodiment) on the printer status that is stored in a nonvolatile RAM (NVRAM) 1-22 in the printer 1-16. A RAM 1-24 mainly functions as a main memory, work area, and the like for the CPU 1-23. An operation panel 1-18 comprises operation switches, LED indicators, and the like.

The present invention is also applicable to a printing system in which the host computer 1-1 and printer 1-16 can communicate with each other via a network such as a LAN instead of the bidirectional interface 1-15 in FIG. 1. In this case, the interface 1-20 and printer interface 1-9 are formed from network controllers (NCs). The NVRAM 1-22 stores print setting information sent from the host computer 1-1. The RAM 1-24 can allocate a buffer area for holding print information received from the host computer 1-1, and the work area of the CPU 1-23. The printing unit (printer engine) 1-17 has an arrangement compliant with the printing scheme. In the embodiment, the printing unit (printer engine) 1-17 has an inkjet type arrangement, and comprises a printer cartridge and carriage. Also, a plurality of paper feed units (three in the embodiment) are arranged. Printing is done by supplying paper from a paper feed unit specified by information (to be also simply referred to as paper feed unit designation) for designating a paper feed unit in print setting information contained in a print job.

The interface 1-20 receives print data from the host computer 1-1 in accordance with a predetermined protocol, and notifies the host computer 1-1 of status information and the like in the printer 1-16. The CPU 1-23 can control power supply from a power supply unit (not shown), and when it does not receive data from the host computer 1-1 for a predetermined time, performs sleep control to save power supply to each unit. Print data contains commands to cause a printer to perform a predetermined operation, and parameters for the operation. The print data does not mean only data representing an image to be printed. Under the control of a program executed by the CPU 1-23, the operation panel 1-18 displays (or silk-prints) a user interface for switching the paper feed unit. For example, the NVRAM 1-22 stores identification information for specifying a paper feed unit designated via the user interface.

Figure 2:
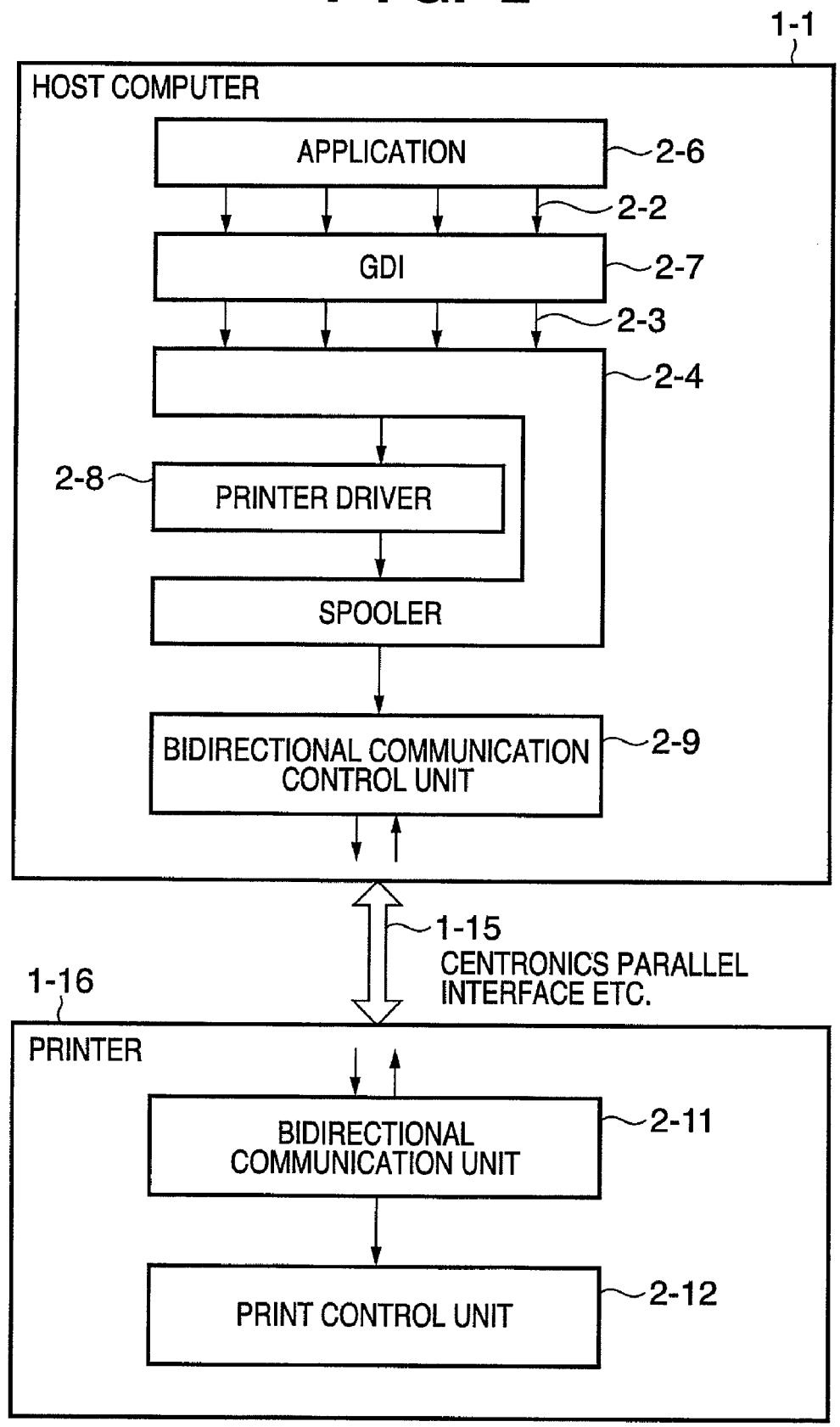
FIG. 2 is a block diagram showing a software configuration to which the data processing apparatus according to the embodiment of the present invention is applicable.

FIG. 2 is a block diagram showing an example of a software configuration when performing a print process using a printer driver installed in the host computer 1-1. The host computer 1-1 and printer 1-16 are connected by the interface cable 1-15 such as a Centronics interface, USB interface, or network interface, and can communicate with each other. The host computer 1-1 and printer 1-16 may communicate with each other wirelessly with infrared rays or the like.

FIG. 2, an application 2-6 capable of creating or editing, e.g., a document or image issues a print instruction 2-2 to a graphics driver interface (to be referred to as a GDI hereinafter) 2-7. In this case, the GDI 2-7 issues a device driver interface (to be referred to as a DDI hereinafter) instruction 2-3 to a printer driver 2-8 via a spooler 2-4. Upon receiving the DDI instruction 2-3, the printer driver 2-8 converts it into a print command executable by the printer 1-16, and transfers the print command to a bidirectional communication control unit 2-9 via the spooler 2-4.

The bidirectional communication control unit 2-9 transmits the print command to a bidirectional communication unit 2-11 of the printer 1-16 via the communication cable 1-15. The bidirectional communication unit 2-11 of the printer 1-16 transfers the received print command to a print control unit 2-12. The print control unit 2-12 executes a print process associated with the print command. The print control unit 2-12 corresponds to the controller 1-19 in FIG. 1.

Figure 3:
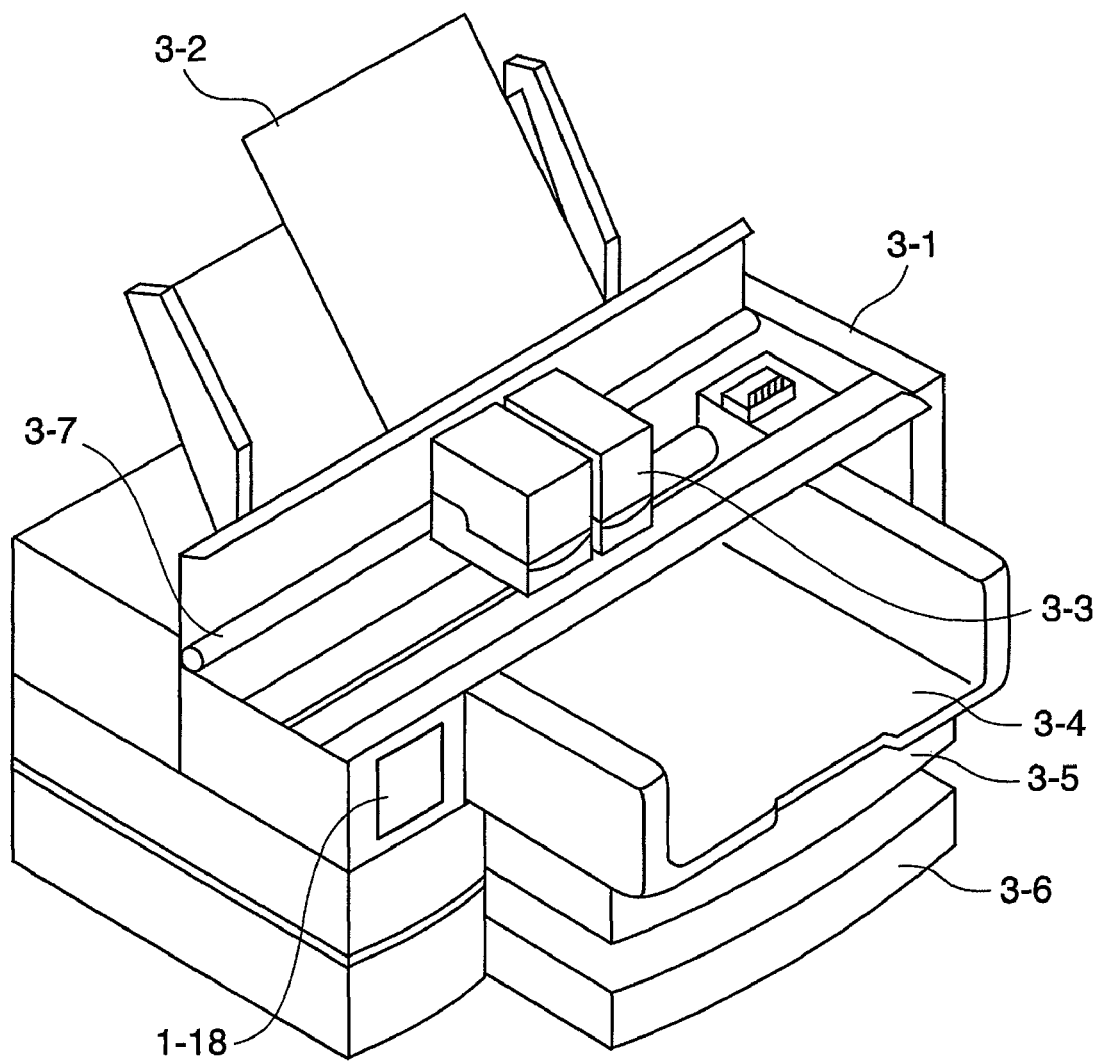
FIG. 3 is a perspective view showing the schematic structure of a printer to which the data processing apparatus according to the embodiment of the present invention is applicable.

FIG. 3 is a view showing the schematic structure of a printer to which a data processing apparatus according to the first to third embodiments is applicable. A printer 3-1 (synonymous with the printer 1-16) is not particularly limited as long as it comprises selectively available paper feed units. In this example, the printer 3-1 is an inkjet color printer. As other printer types, printers of various printing types such as the laser beam type and thermal transfer type are available.

The printer 3-1 shown in FIG. 3 comprises three paper feed units loaded with unprinted sheets, which are an auto sheet feeder 3-2, upper cassette 3-5, and lower cassette 3-6. Each paper feed unit allows setting arbitrary paper, i.e., paper of an arbitrary size and type. It is possible to simultaneously set, for example, B5-size normal paper in the upper cassette 3-5, A4-size normal paper in the lower cassette 3-6, and L-size photo paper on the auto sheet feeder 3-2.

When printing starts, paper in each paper feed unit is conveyed to a predetermined print position in the paper convey direction (main scanning direction in the case of a serial inkjet printer). When paper reaches the print position, the inkjet head discharges ink from its ink nozzles while a carriage 3-3 supporting the inkjet head moves in the subscanning direction perpendicular to the paper convey direction, thereby printing image data on the paper. After printing by the carriage 3-3, paper fed from the auto sheet feeder 3-2, upper cassette 3-5, or lower cassette 3-6 is discharged onto a delivery tray 3-4.

FIG. 3 shows a printer having three paper feed units. However, the number of paper feed units of a printer to which the data processing apparatus according to the embodiment of the present invention is applicable is not limited.

The printer 3-1 comprises the printer operation panel 1-18. The user can operate a button on the operation panel 1-18 to designate (select) in advance one of the auto sheet feeder 3-2, upper cassette 3-5, and lower cassette 3-6 before the start of printing. This allows simultaneously setting, for example, B5-size normal paper in the upper cassette 3-5, A4-size normal paper in the lower cassette 3-6, and L-size photo paper on the auto sheet feeder 3-2. Before printing, the user can switch selection of a paper feed unit for use in printing on the operation panel 1-18.

Figure 13:
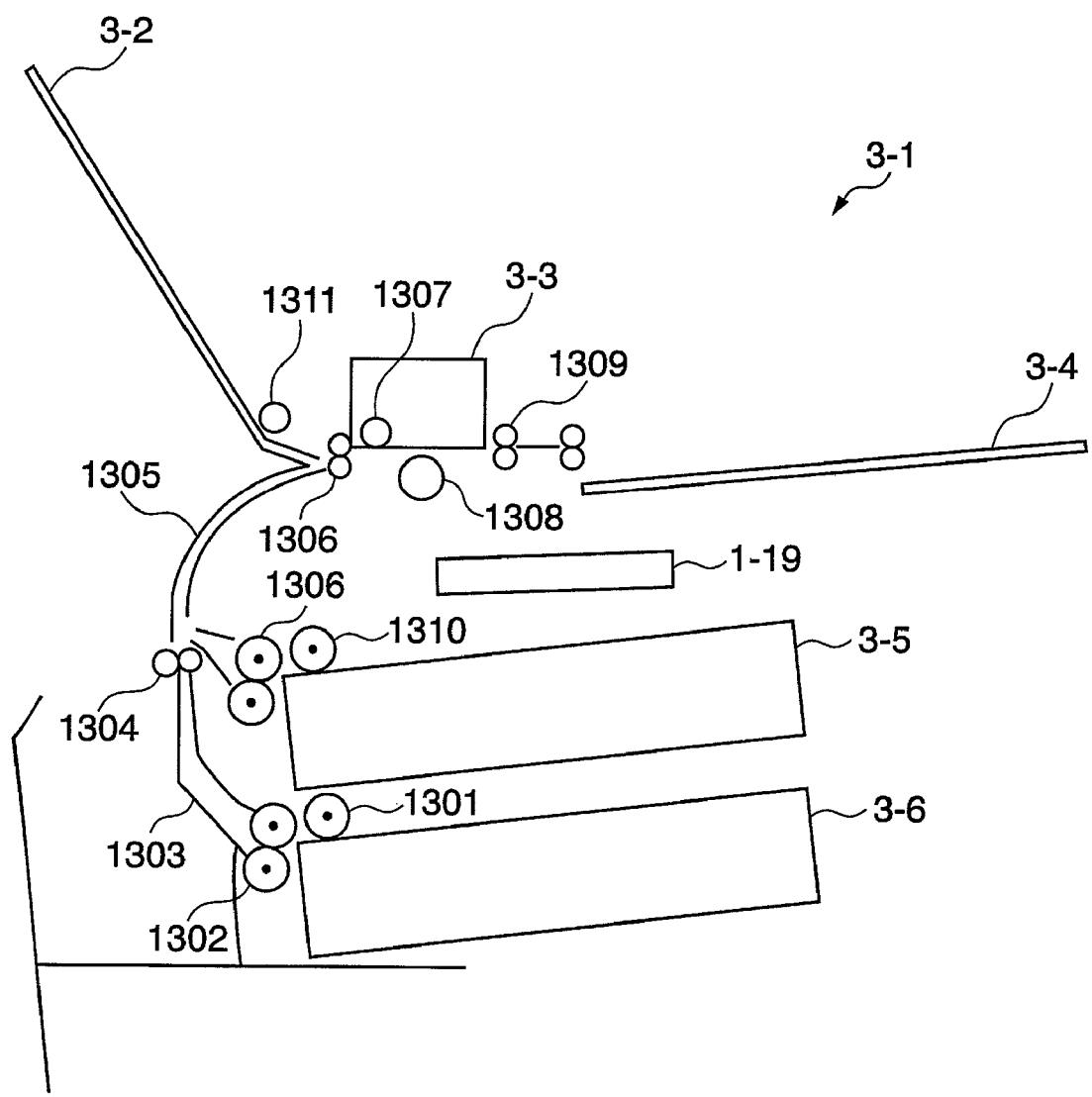
FIG. 13 is a sectional view of an inkjet printer according to the embodiment.

FIG. 13 is a schematic sectional view showing the printer 3-1. When the paper feed unit (paper feed cassette) 3-6 is selected, pickup rollers 1301 rotate to pick up the top sheet among sheets in the paper feed unit 3-6 in accordance with execution of a print job. The picked sheet passes through a convey path 1303 by rotation of convey rollers 1302, similarly passes through convey rollers 1304 and a convey path 1305, and reaches a print position on a platen 1308. Convey rollers 1306 and convey rollers 1309 keep the sheet flat on the platen 1308. An ink image is formed on the sheet by subscanning of the carriage 3-3 along a slide rail 1307 and ink discharge synchronized with the subscanning. The sheet bearing the image is discharged onto the delivery tray 3-4.

When the paper feed cassette 3-5 is selected, pickup rollers 1310 are driven at the same time as the start of a print job to feed a sheet from the paper feed cassette 3-5. When the auto sheet feeder 3-2 is selected, a pickup roller 1311 is driven at the same time as the start of a print job to feed a sheet from the auto sheet feeder 3-2. The controller 1-19 executes these control operations.

Figure 4A:
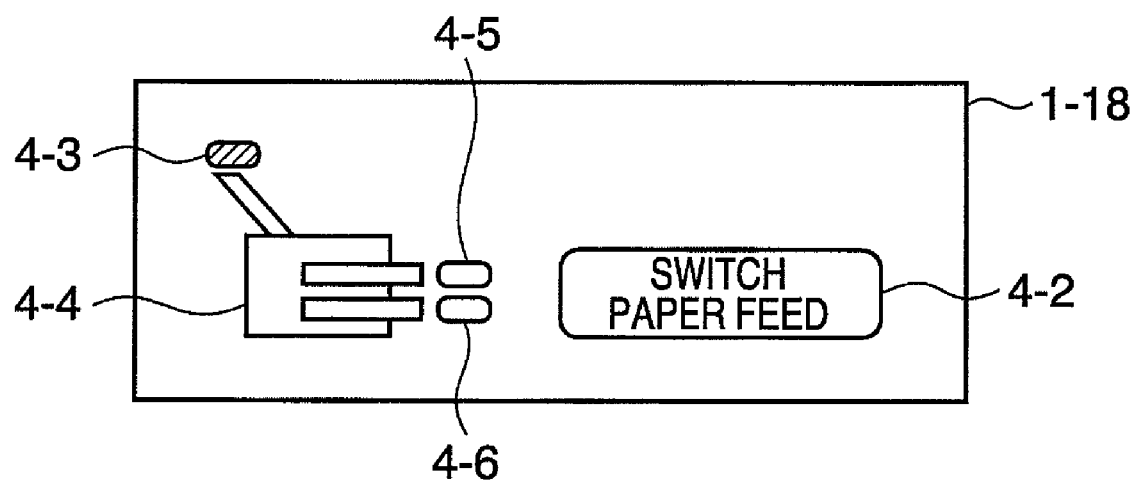
FIG. 4A is a view showing the arrangement of a printer operation panel to which the data processing apparatus according to the embodiment of the present invention is applicable.

FIG. 4A is an enlarged view of the printer operation panel 1-18 of the printer 3-1 shown in FIG. 3. The operation panel 1-18 has a paper feed switching button 4-2, and a printer icon silk print 4-4 displaying a currently selected paper feed unit. The operation panel 1-18 also has an LED 4-3 representing that the auto sheet feeder is selected, an LED 4-5 representing that the upper cassette is selected, and an LED 4-6 representing that the lower cassette is selected.

An LED corresponding to a selected paper feed unit is turned on among the LEDs 4-3, 4-5, and 4-6 representing respective paper feed units, and the remaining LEDs are OFF. In other words, one LED is exclusively turned on. Every time the user presses the paper feed switching button 4-2, a selected paper feed unit is switched in a round-robin fashion. Then, an LED corresponding to the currently selected paper feed unit is turned on. In the example of FIG. 4A, the LED 4-3 representing that the auto sheet feeder is selected is turned on. For example, every time the user presses the switching button 4-2, the selected paper feed unit changes in the order of the auto sheet feeder, upper cassette, and lower cassette. Along with this, the ON LED switches in the order of the LED 4-3 representing that the auto sheet feeder is selected, the LED 4-5 representing that the upper cassette is selected, and the LED 4-6 representing that the lower cassette is selected. Since the selected paper feed unit switches, the user can select a paper feed unit for use in printing with the paper feed switching button 4-2.

Figure 4B:
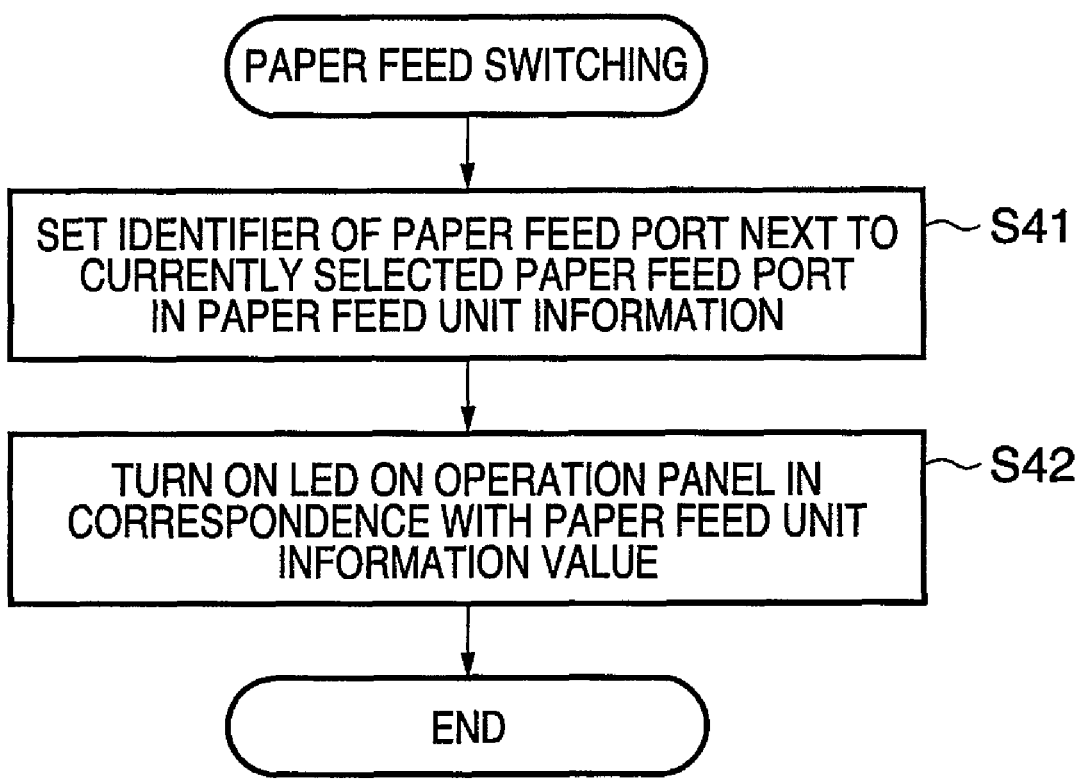
FIG. 4B is a control flowchart in switching a paper feed unit.

FIG. 4B shows an example of process procedures by the CPU 1-23 upon pressing the switching button 4-2. Respective paper feed units have unique identifiers. For example, the NVRAM 1-22 stores the identifier of a selected paper feed unit as panel information. When the user presses the switching button 4-2, the CPU 1-23 reads the identifier of a currently selected paper feed unit by referring to the panel information. The CPU 1-23 sets and stores, in the panel information, the identifier of a paper feed unit to be selected next to the paper feed unit of the read identifier (S41). The paper feed unit to be selected next can be decided in the order determined in advance by a round robin. Then, an LED corresponding to the identifier of the newly selected paper feed unit on the operation panel is turned on. The LEDs of unselected paper feed units are OFF.

Figure 5A:
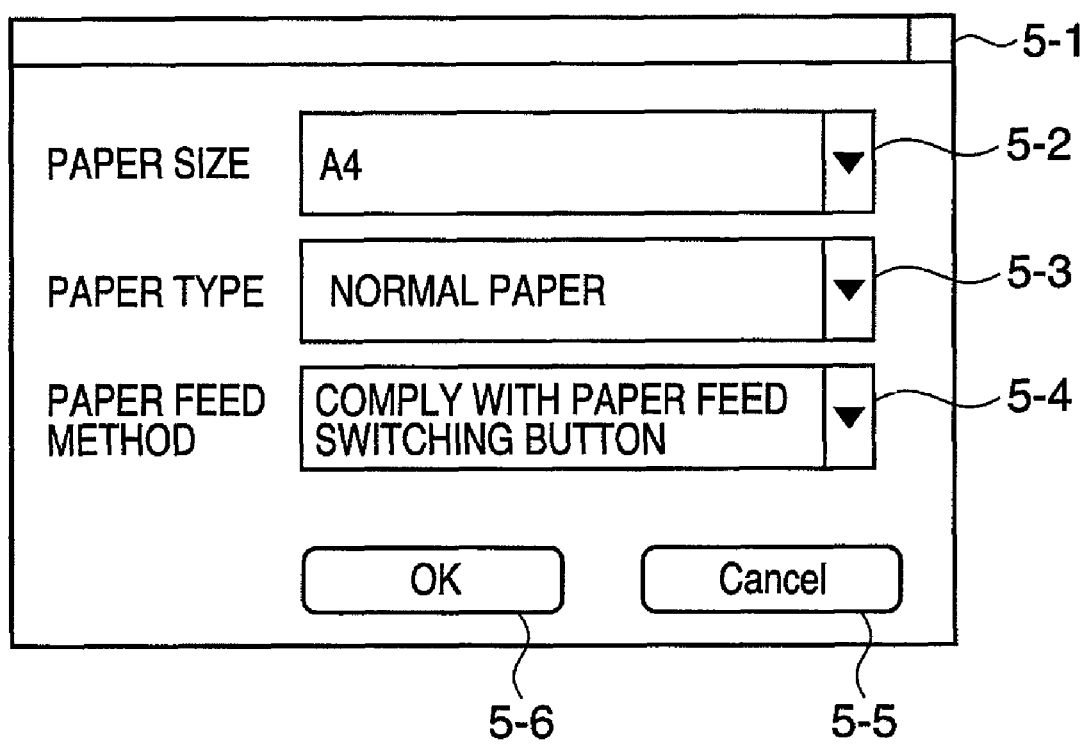
FIGS. 5A and 5B are views showing the arrangement of a printer driver setup dialog box to make print settings according to the embodiment of the present invention.
Figure 5B:
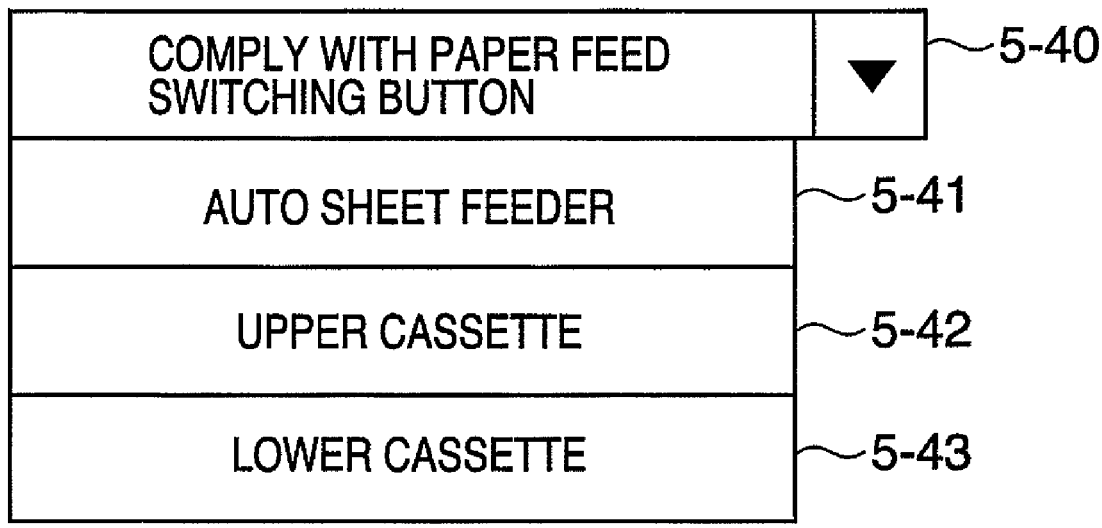

FIGS. 5A and 5B show an example of the arrangement of a printer driver setup dialog box displayed by the printer driver 2-8 on the host computer 1-1 in FIG. 2 to make print settings compliant with a desired print result. Upon receiving a display instruction from the application 2-6 via the spooler 2-4 and GDI 2-7, the printer driver 2-8 displays a dialog box 5-1. The dialog box 5-1 can be displayed before issuing a print start instruction from the application software 2-6 on the host computer 1-1. The user can select a paper size, paper type, and paper feed method via the dialog 5-1.

In FIG. 5A, the printer driver setup window 5-1 has a paper size selection column 5-2, paper type selection column 5-3, paper feed method selection column 5-4, OK button 5-6, and cancel button 5-5. For example, the external memory 1-4 stores a value selected in each column as part of print setting information. As shown in FIG. 5B, the paper feed method selection column 5-4 allows selecting a desired value from four choices "comply with the paper feed switching button", "auto sheet feeder", "upper cassette", and "lower cassette". A paper feed method selected in the paper feed method selection column 5-4 is preferably stored together with an identifier common to that of a paper feed unit that is stored as panel information in the printer. However, the choice "comply with the paper feed switching button" indicates a so-called virtual paper feed unit, and cannot be selected from the printer 1-16. In this case, therefore, a unique identifier is assigned to a paper feed unit corresponding to "comply with the paper feed switching button".

A print command transmitted from the printer driver 2-8 to the printer main body 1-16 contains a paper feed method instruction (paper feed method information) which designates a paper feed unit selected in the paper feed method selection column. In addition, the print command also contains instructions (paper size information and paper type information) representing a selected paper size and selected paper type, respectively. In the printer main body 1-16, the print control unit 2-12 specifies a paper feed unit for actually feeding paper in printing, from the paper feed method instruction in the print command and a current paper feed method (i.e., panel information) selected on the operation panel 1-18 of the printer main body 1-16.

In the printing system described in this specification, a paper feed method selected on the operation panel 1-18 of the printer main body 1-16 becomes valid only when the user selects "comply with the paper feed switching button" in the paper feed method selection column 5-4. In contrast, the printer main body 1-16 ignores a paper feed method selected on the operation panel 1-18 when the user selects a value other than "comply with the paper feed switching button" in the paper feed method selection column 5-4. The value other than "comply with the paper feed switching button" is "auto sheet feeder", "upper cassette", or "lower cassette". In this case, paper is fed from a paper feed unit "auto sheet feeder", "upper cassette", or "lower cassette" selected in the paper feed method selection column 5-4 of the dialog box 5-1. This specification gives priority to a selection on the operation panel 1-18 of the printer main body as long as the user selects "comply with the paper feed switching button" in the printer driver setup window (dialog 5-1).

In the embodiment, the default value in the paper feed method selection column 5-4 of the dialog box 5-1 is "comply with the paper feed switching button". That is, the default setting gives priority to a paper feed setting selected on the operation panel 1-18 of the printer main body.

Figure 5C:
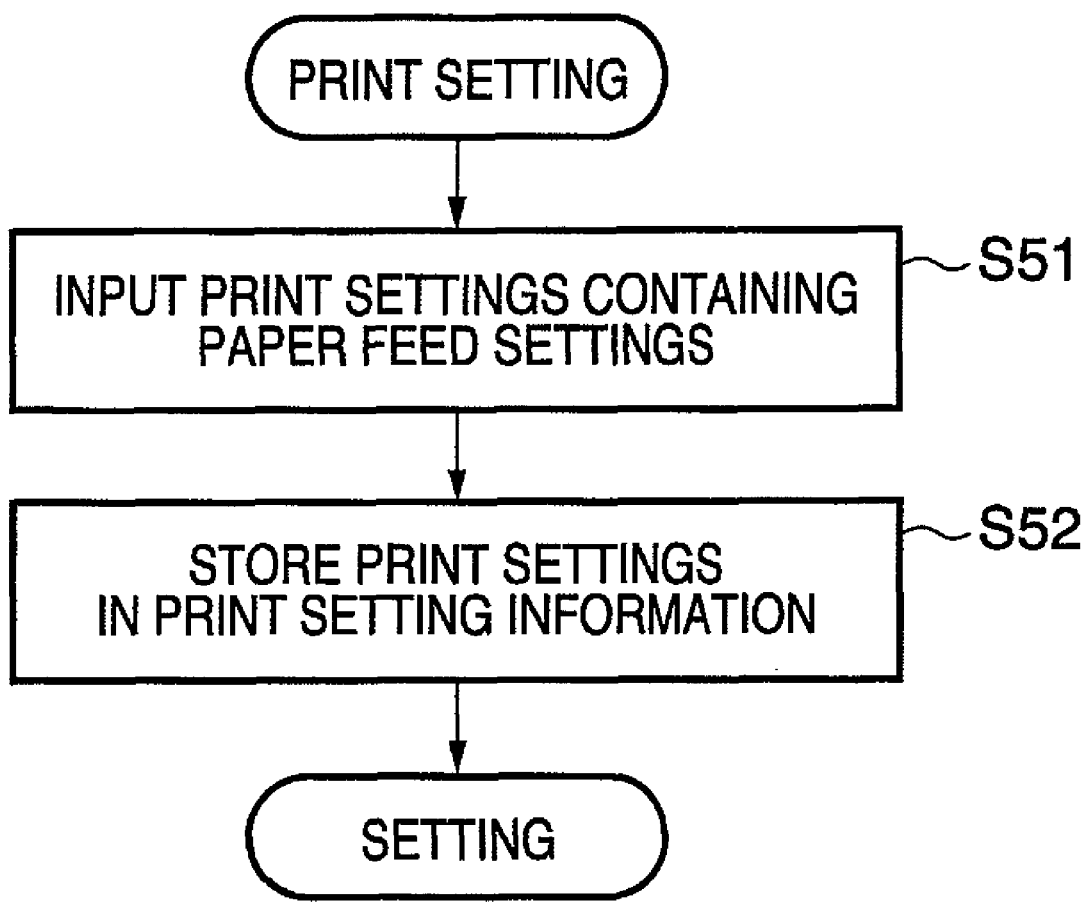
FIG. 5C is a flowchart of making print settings according to the embodiment of the present invention.

FIG. 5C shows procedures by the printer driver 2-8 to store print setting information input via the dialog box 5-1 in FIG. 5A or the like. The printer driver 2-8 accepts inputs such as a paper size, paper type, and paper feed method via the dialog box 5-1 or the like (S51). If the user presses the OK button 5-6, the printer driver 2-8 stores various setting values input at that time as print setting information (S52).

Figure 6:
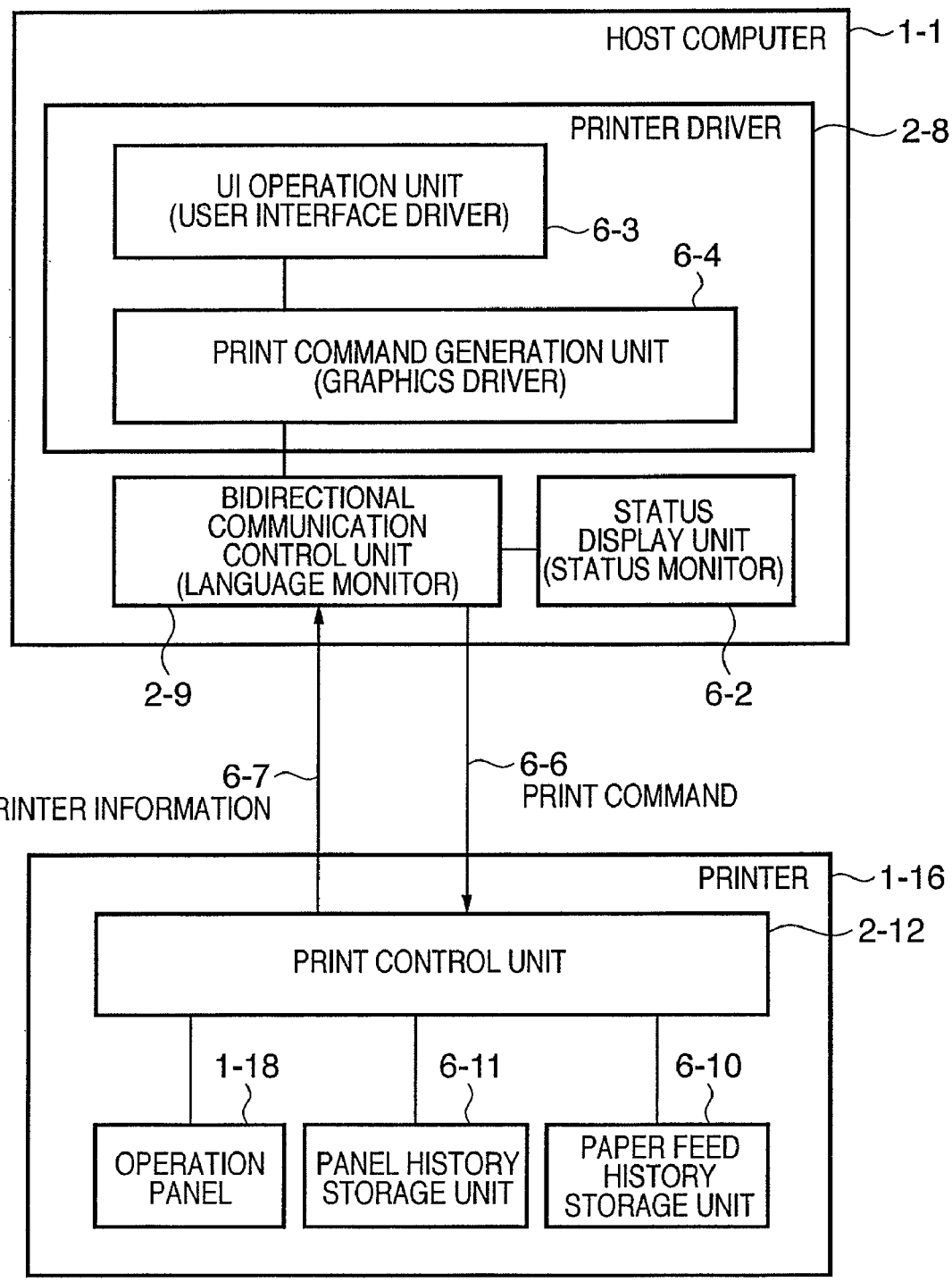
FIG. 6 is a block diagram showing an extracted main part of the software configuration according to the embodiment of the present invention.

FIG. 6 is a block diagram showing an extracted main part of a software configuration, to which the data processing apparatus according to the embodiment is applicable, in the printing system made up of the printer driver (host) and printer according to the present invention. In FIG. 6, relevant elements receive attention, and other elements are excluded. In FIG. 6, the printer driver (host) 2-8 has a UI operation unit (user interface driver) 6-3 which manages input of print settings of the printer driver from the user, as shown in FIG. 6, and a print command generation unit (graphics driver) 6-4. The print command generation unit (graphics driver) 6-4 converts the graphic information 2-2, which is output from application software in accordance with a print instruction from the application software, into a print command 6-6 interpretable by the print control unit 2-12. The UI operation unit (user interface driver) 6-3 executes the procedures in FIG. 5C, and displays the dialog box 5-1 in FIG. 5A to accept input of print settings.

The bidirectional communication control unit (language monitor) 2-9 transmits the print command 6-6 generated by the print command generation unit (graphics driver) 6-4 to the printer while bidirectionally communicating with a printer control unit 2-12. A status display unit (status monitor) 6-2 displays the current status of the printer 1-16, i.e., the absence of paper, the remaining ink amount, and the like on the CRT of the host computer. The printer driver 2-8 may contain the bidirectional communication control unit (language monitor) 2-9 and status display unit (status monitor) 6-2.

The printer 1-16 receives the print command 6-6 transmitted from the bidirectional communication control unit 2-9 of the printer driver (host) 2-8. The print control unit 2-12 specifies a designated paper feed unit on the basis of the print command 6-6, and performs, e.g., conversion into data of a format outputtable from the printer engine. The operation panel 1-18 accepts selection of a paper feed unit, and stores it as panel information. As described above, the print command 6-6 generated by the print command generation unit 6-4 contains the setting values of setting items input by the user from the dialog box 5-1 shown in FIG. 5A. The print command 6-6 generated by the print command generation unit 6-4 also contains the user name of a user who executed printing. The print command 6-6 further contains a paper size, paper type, and the like. In this example, the settings of the paper size, paper type, and paper feed method are called paper settings at once.

The print control unit 2-12 has a function of performing and completing printing in accordance with setting items in the print command 6-6 upon receiving the print command 6-6.

As building components especially associated with the present invention, the printer 1-16 has a panel history storage unit 6-11 and paper feed history storage unit 6-10. The panel history storage unit 6-11 has a function of storing information (called panel history information) representing a paper feed method selected on the operation panel 1-18 upon executing a print job. The paper feed history storage unit 6-10 has a function of storing, for each paper feed unit of the printer, paper information (paper type and paper size) and a user name that are contained in a print job for which the paper feed unit was used finally. For example, when a given print job uses the upper paper feed cassette, paper information (paper type and paper size) and a user name that are contained in the print job are stored as paper feed history information together with an identifier representing the upper paper feed cassette as an index. When giving attention to a specific paper feed unit in paper feed history information, information associated with the paper feed unit (e.g., paper information and a user name) is called paper feed history information of the paper feed unit.

By using the paper feed history information 6-10 and panel history information 6-11, which are features of the present invention, the host implements a process to appropriately output a warning and avoid an erroneous print operation when the user selects, on the operation panel, a paper feed unit which does not match print contents. For example, the bidirectional communication control unit (language monitor) 2-9 and status display unit (status monitor) 6-2 implement this process.

Based on the above-described common part, embodiments of the present invention will be explained mainly for differences between the embodiments.

First Embodiment

The first embodiment is related to a configuration of determining the validity of a paper feed method by using user name information and paper information including the paper feed method, paper type, and paper size. For each of all selectable paper feed units, paper feed history information contains, in association with each other, a paper size, paper type, and print user name set for a print job for which the paper feed unit was used finally.

FIG. 7A is a table showing an example of paper feed history information. A paper feed history storage unit 6-10 stores the paper feed history information shown in FIG. 7A. For each paper feed unit, the paper feed history information 6-10 contains a set of "paper size set for a previous print job (to be simply referred to as previous printing hereinafter) using the paper feed unit" information 702, "paper type set for previous printing" information 703, and "user name for previous printing" 704. "Previous" means "final" except for a print job in execution. In the example of FIG. 7A, the auto sheet feeder is associated with L size/photo paper/user A; the upper cassette, B5/normal paper/user B; and the lower cassette, A4/normal paper/user B. For example, when two print jobs using the upper cassette are successively executed, paper information and user information associated with "upper cassette" are updated successively twice. During this period, paper information and user information associated with the remaining paper feed units are not updated.

FIG. 8 is a view showing an example of panel history information stored in a panel history storage unit 6-11 in FIG. 6. As shown in FIG. 8, the panel history storage unit 6-11 stores "paper feed position used in previous printing by the paper feed switching button" that is selected with the paper feed switching button on an printer operation panel 1-18. In the example of FIG. 8, the paper feed unit of the auto sheet feeder is selected with the paper feed switching button in previous printing.

Figure 9A:
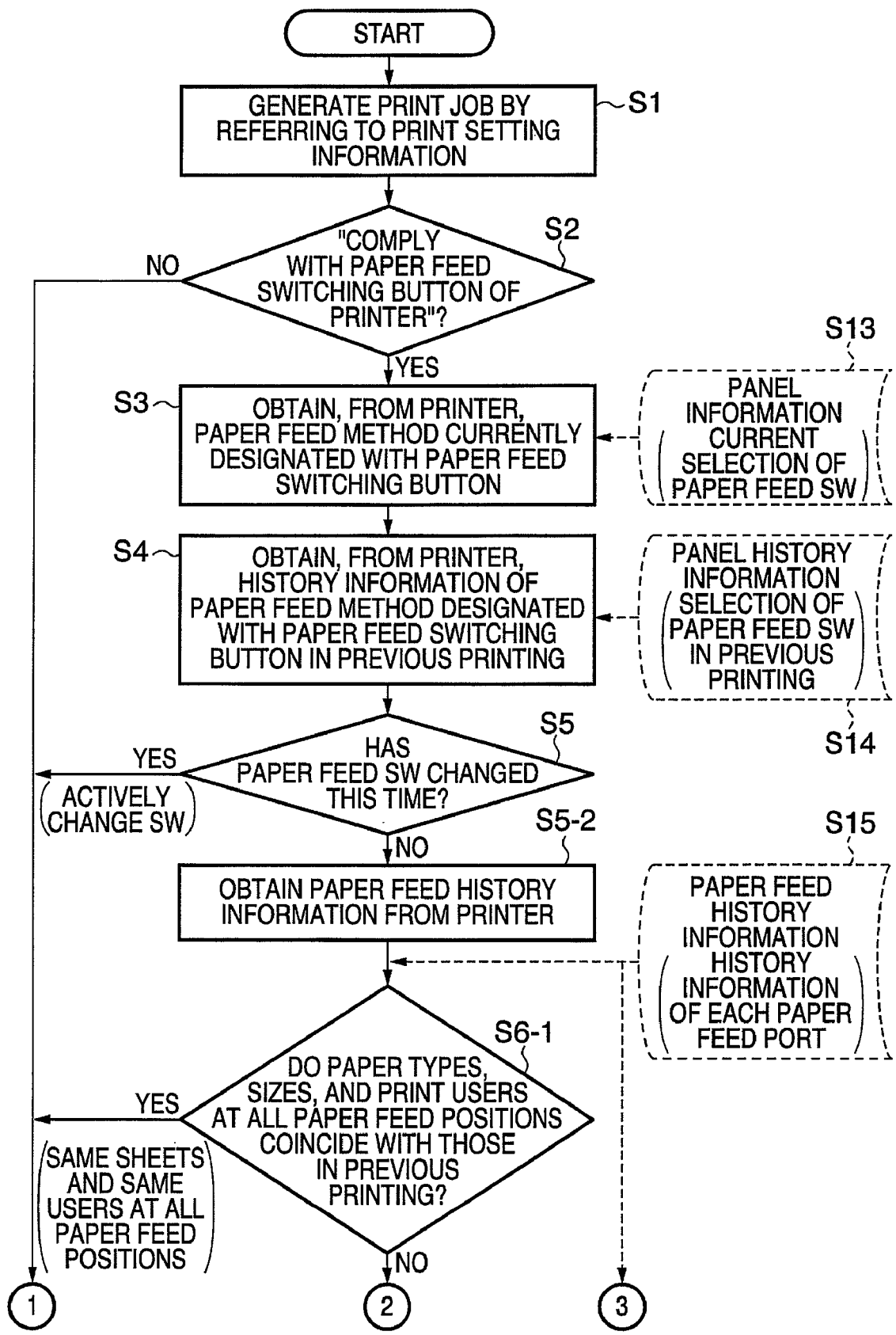
FIGS. 9A and 9B are flowcharts showing a print data transfer process according to the first embodiment of the present invention.
Figure 9B:
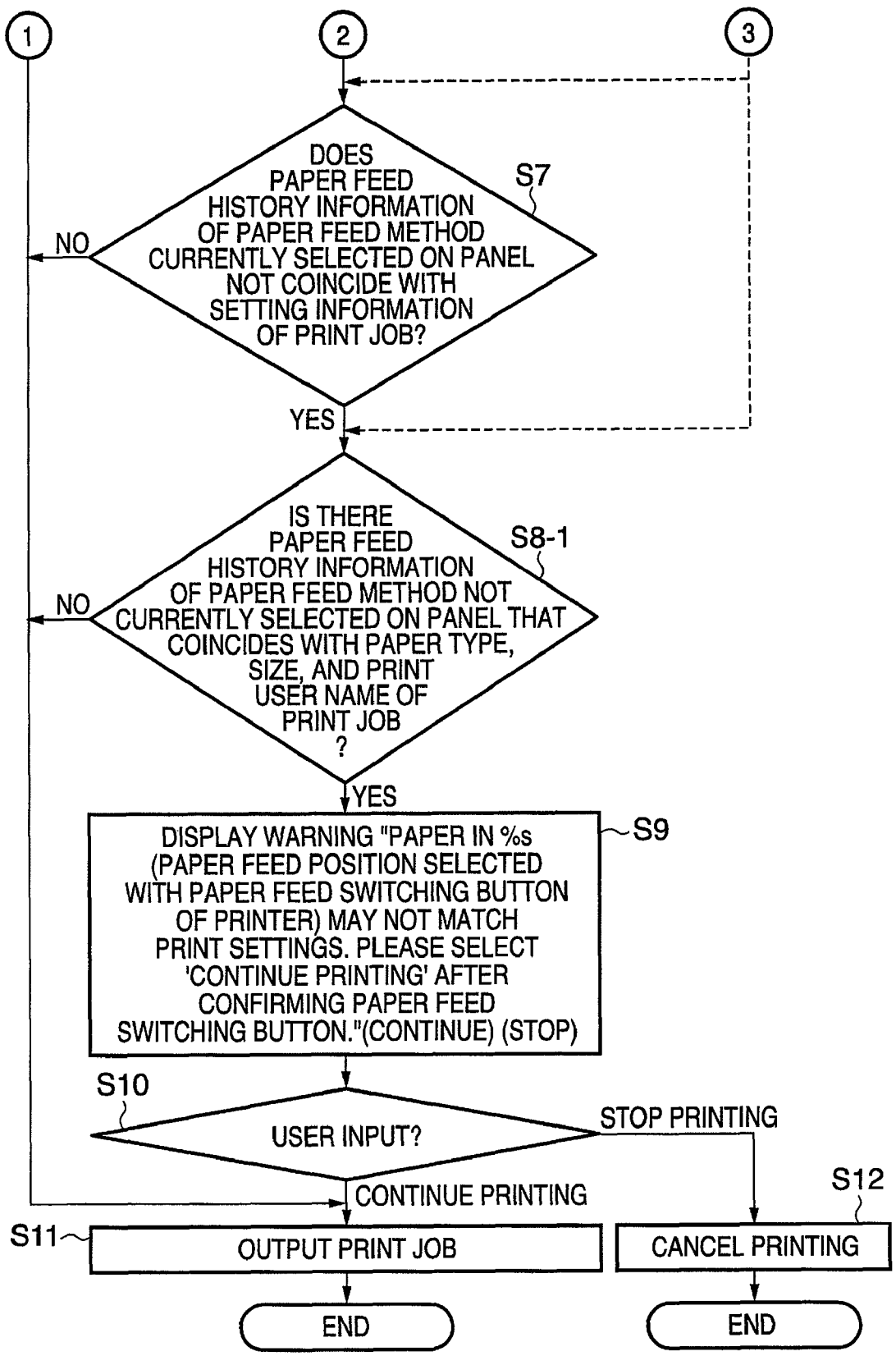

FIGS. 9A and 9B are flowcharts showing a print data transfer process according to the first embodiment. This sequence shows a process to appropriately output a warning and avoid an erroneous print operation by using paper feed history information and panel history information, which are features of the present invention, when the user selects, on the operation panel, a paper feed unit which does not match print contents. A host computer 1-1 executes this sequence. In particular, a bidirectional communication control unit (language monitor) 2-9 and status display unit (status monitor) 6-2 in a printer driver (host) 2-8 implement this process.

The process operation of the printer driver in the first embodiment will be explained in detail with reference to FIG. 6 and the flowcharts of FIGS. 9A and 9B.

When an application program performs a print operation, the printer driver (host) 2-8 creates a print job by referring to print setting information in step S1. That is, the printer driver 2-8 uses a print command generation unit (graphics driver) 6-4 to convert print data output from the application program into a print command 6-6. The print command is added after a job header to form a print job. The generated print job subjected to processes in step S2 and subsequent steps will be called a target print job. Print setting information is set by the user via a UI operation unit 6-3 and stored. The application generates a GDI instruction containing the print setting information, and issues it. The print command generation unit 6-4 can obtain print settings from the GUI instruction, and issues the print command 6-6 compliant with the obtained print setting information to a print control unit 2-12 of a printer 1-16 via the bidirectional communication control unit 2-9.

The bidirectional communication control unit 2-9 obtains a paper feed method setting value designated by the print command 6-6 (i.e., contained in the print job) received from the print command generation unit 6-4. The bidirectional communication control unit 2-9 determines whether the setting value means "comply with the paper feed switching button of the printer" (step S2). If the paper feed method designated by the print command is not "comply with the paper feed switching button of the printer", for example, a value representing "auto sheet feeder", "upper cassette", or "lower cassette" is designated, the process branches to step S11. In this case, a setting on the printer operation panel is ignored, and a paper feed unit designated by a paper feed method contained in a print job is preferentially used as the paper feed unit of the print job. In this case, printing continues by transmitting the print command 6-6 to the print control unit 2-12 of the printer 1-16 without performing the erroneous print operation prevention process, which is a feature of the present invention, and therefore displaying any warning (step S11).

If "comply with the paper feed switching button of the printer" is designated as the paper feed method in the print command, the printer driver 2-8 obtains the current panel information as printer information 6-7 from the printer 1-16 (step S3). The panel information is a value representing the currently selected paper feed method.

The printer driver 2-8 obtains panel history information stored in the panel history storage unit 6-11 of the printer 1-16 as the printer information 6-7 via the print control unit 2-12 (step S4). The panel history information is panel information in executing a previous print job for which "comply with the paper feed switching button of the printer" is designated as the paper feed method.

The printer driver 2-8 compares the current panel information obtained in step S3 with the panel history information obtained in step S4. From this comparison, the printer driver 2-8 determines whether the paper feed unit used for the current target print job has switched from one used when storing the panel history information (step S5).

If the printer driver 2-8 determines in step S5 that the paper feed unit currently selected on the printer operation panel does not correspond to one selected on the printer operation panel in previous printing, the process branches to step S11.

In contrast, if the printer driver 2-8 determines in step S5 that the paper feed unit currently selected on the printer operation panel corresponds to one selected on the printer operation panel in previous printing, the process branches to step S5-2. In step S5-2, the printer driver 2-8 obtains paper feed history information stored in the paper feed history storage unit 6-10 from the printer. Then, the printer driver 2-8 refers to paper information and the user name history associated with each paper feed unit.

Referring to the paper feed history information, the printer driver 2-8 determines whether the paper sizes of all the paper feed units coincide with those in previous printing, the paper types of all the paper feed units coincide with those in previous printing, and the print user names of all the paper feed units coincide with those in previous printing (step S6-1). The purpose of this determination is to determine a use style in which sheets of the same paper sizes and same paper types as those in previous printing are set in all the paper feed units and the print users of all the paper feed units are the same as those in previous printing. If this condition is satisfied, paper supplied from a paper feed unit selected on the operation panel 1-18 is highly likely to have a paper size and paper type designated by the current target print job regardless of selection of the paper feed unit. For this reason, the process branches to step S11 to continue printing without outputting any warning.

If the printer driver 2-8 determines in step S6-1 that the paper type, paper type, and print user of each paper feed unit do not coincide with those in previous printing in the paper feed history information, the process branches to step S7. In step S7, the printer driver 2-8 compares paper feed history information of a paper feed unit currently selected on the operation panel with information on the paper type, paper size, and print user contained in the target print job (print command) to be output. Then, the printer driver 2-8 determines whether these pieces of information coincide with each other, i.e., whether paper information of the current print job does not coincide with paper feed history information immediately preceding to a paper feed method used in current printing (step S7). If these pieces of information coincide with each other, the print job designates the same paper feed unit as that designated in previous printing. Further in this case, the paper feed unit is loaded with paper of the same paper type and paper size as those in previous printing, and the print user is also the same at high possibility. Thus, printing continues without displaying any warning (step S11).

If these pieces of information do not coincide with each other in step S7, the process branches to step S8-1. In step S8-1, the printer driver 2-8 compares paper feed history information of a paper feed unit not currently selected on the operation panel 1-18 with information on the paper type, paper size, and print user contained as print setting information in the target print job (print command) to be output. Then, the printer driver 2-8 determines whether there is coincident information (step S8-1). The paper feed unit not currently selected on the operation panel 1-18 is one other than a paper feed unit indicated by panel information obtained in step S3. If the paper feed history information of the paper feed unit not currently selected on the operation panel 1-18 does not contain any information coincident with the information on the paper type, paper size, and print user contained in the print command, the process branches to step S11. This is because current printing highly likely uses a paper feed unit for which the user sets a new paper size or paper type. In this case, printing continues without displaying any warning (step S11).

If the paper feed history information of the paper feed unit not currently selected on the operation panel 1-18 contains even one information coincident with the information on the paper type and paper size and the print user which are contained in the print command, the process branches to step S9. In this case, it can be considered that the paper feed unit selected on the operation panel 1-18 has changed between previous printing and current printing and settings are not restored to correct ones at a high possibility. Hence, the bidirectional communication control unit 2-9 issues an instruction to the status display unit 6-2 to display a warning window to this effect (step S9).

Figure 12:
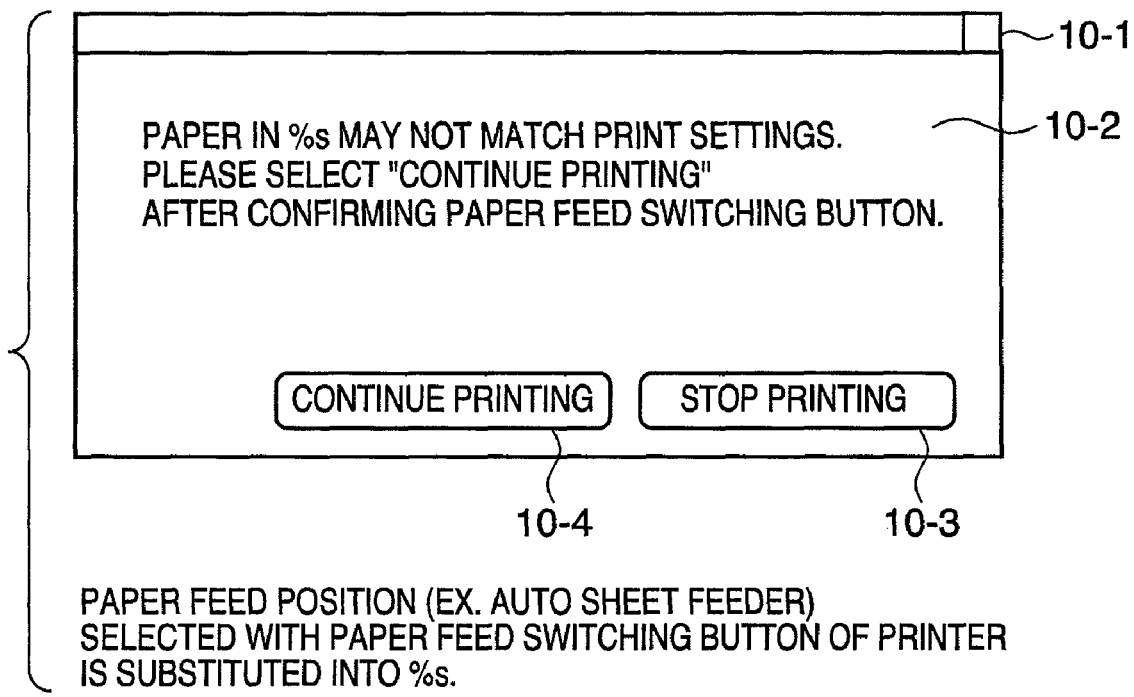
FIG. 12 is a view showing an example of a warning message displayed on a status display unit according to the embodiment of the present invention.

FIG. 12 shows an example of a warning message displayed on the status display unit 6-2 upon receiving the instruction in step S9. In the warning window of FIG. 12, the name (e.g., auto sheet feeder) of a paper feed unit represented by panel information obtained in step S3 is substituted into "% s" in the message. The warning window is displayed on the CRT in FIG. 1.

The warning window has buttons "continue printing" and "stop printing". The user can select either button, and the printer driver 2-8 waits for the selection in step S10. By referring to the warning window, the user confirms whether a paper feed unit currently selected by the printer main body is proper. If the user determines that the selection is erroneous, he operates a paper feed switching button 4-2 on the operation panel 1-18 to select a correct paper feed unit, and presses "continue printing" in the warning window to continue printing (step S11). If the user selects the button "stop printing" in the warning window, the bidirectional communication control unit 2-9 discards the target print job without transmitting it to the printer 1-16, interrupting printing (step S12).

As a result, the process is complete to appropriately output a warning and avoid an erroneous print operation by using printing history information and operation panel history information of each paper feed unit according to the present invention when the user selects, on the operation panel, a paper feed unit which does not match print contents.

Upon receiving a print job, the printer 1-16 executes it. At this time, the printer 1-16 refers to a printing method set in the print job, and if the value "comply with the paper feed switching button" is set, then refers to panel information. The printer 1-16 drives the paper feed roller of a paper feed unit specified by the panel information, starts feeding paper, and forms an image at a proper timing.

Figure 14:
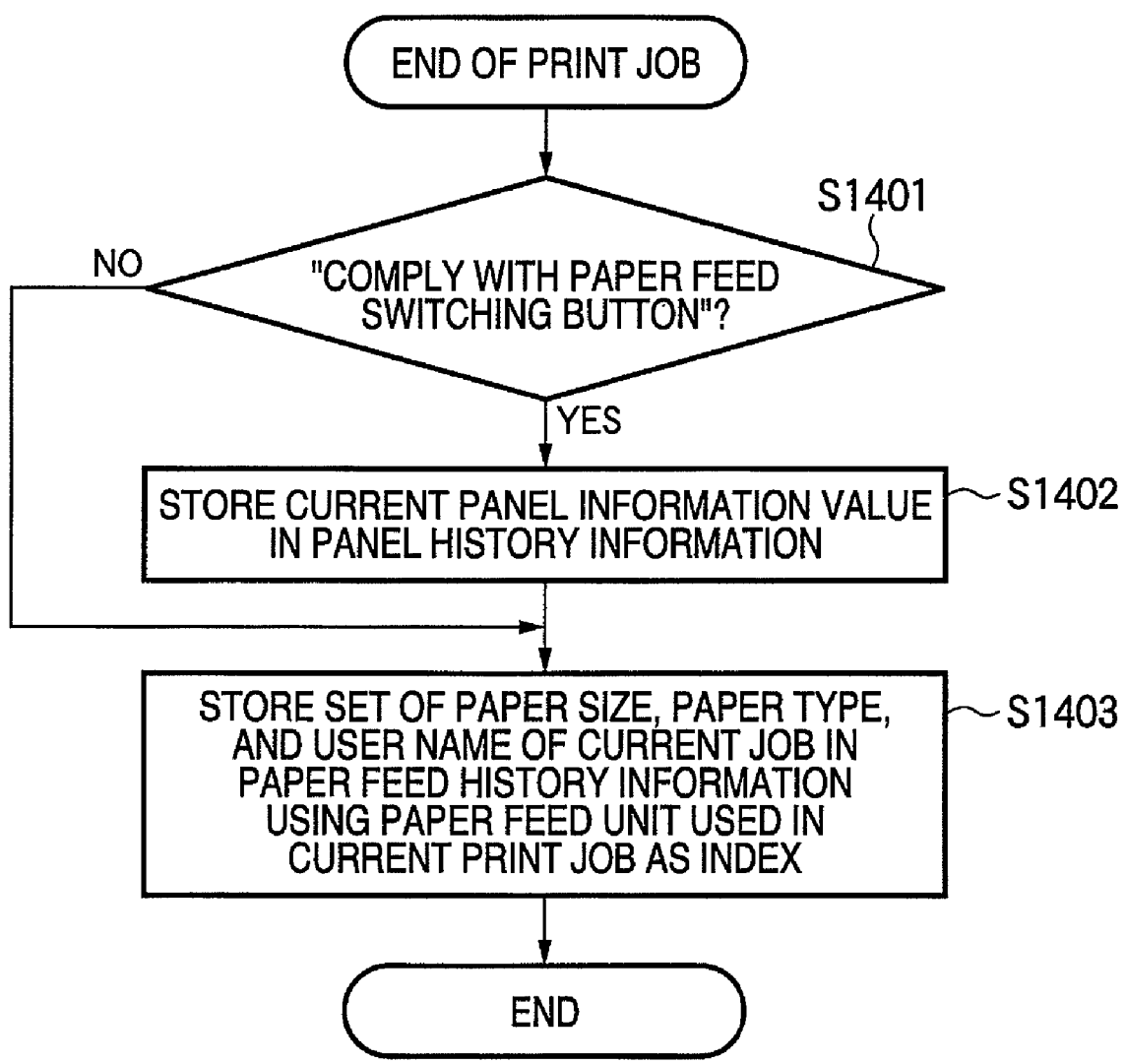
FIG. 14 is a flowchart of procedures to store panel history information and paper feed history information.

FIG. 14 shows procedures executed by a CPU 1-23 of the printer immediately before the end of a print job in execution. In step S1401, the CPU 1-23 determines whether the printing method setting value of a target print job is "comply with the paper feed switching button". If YES in step S1401, the CPU 1-23 stores the current panel information value as panel history information. If NO in step S1401, the process branches to step S1403. The current panel information value is updated when the user operates the paper feed switching button. The CPU 1-23 extracts a paper size, paper type, and user name set for the print job using (in association with) a paper feed unit for use in the current target print job as an index, and stores them as paper feed history information (S1403).

In this way, paper settings associated with a paper feed unit out of print settings contained in a print job output before a target print job are obtained as history information. It is determined whether the paper settings in the obtained history information that correspond to paper settings contained in the target print job are associated with a paper feed unit different from one designated by print settings contained in the target print job. If it is determined that the paper settings in the obtained history information are associated with a different paper feed unit, the paper feed unit currently selected with the paper feed switching button in the printer is highly likely to be improper to the target print job. Thus, a warning is displayed, and the print process stops or continues in accordance with a user instruction.

According to the first embodiment, when it is determined that a selection with the paper feed switching button is highly likely to be improper to the current print job, the user can be notified of this effect, preventing erroneous printing.

Second Embodiment

The second embodiment is related to a configuration in which print data contains information on the paper feed method, paper type, and paper size, and paper feed unit history information contains information on the previous paper sizes and previous paper types of all selectable paper feed units. The second embodiment is different from the first embodiment in that no user name is used to collate paper information. A description of FIG. 8 is common to that in the first embodiment, and will not be repeated.

In FIG. 7B, a history storage unit 6-10 stores a pair of information "paper size used in previous printing" and information "paper type used in previous printing" for each paper feed unit. In the example of FIG. 7B, the history storage unit 6-10 stores a history of printing with L size/photo paper from the auto sheet feeder, B5/normal paper from the upper cassette, and A4/normal paper from the lower cassette.

Figure 10A:
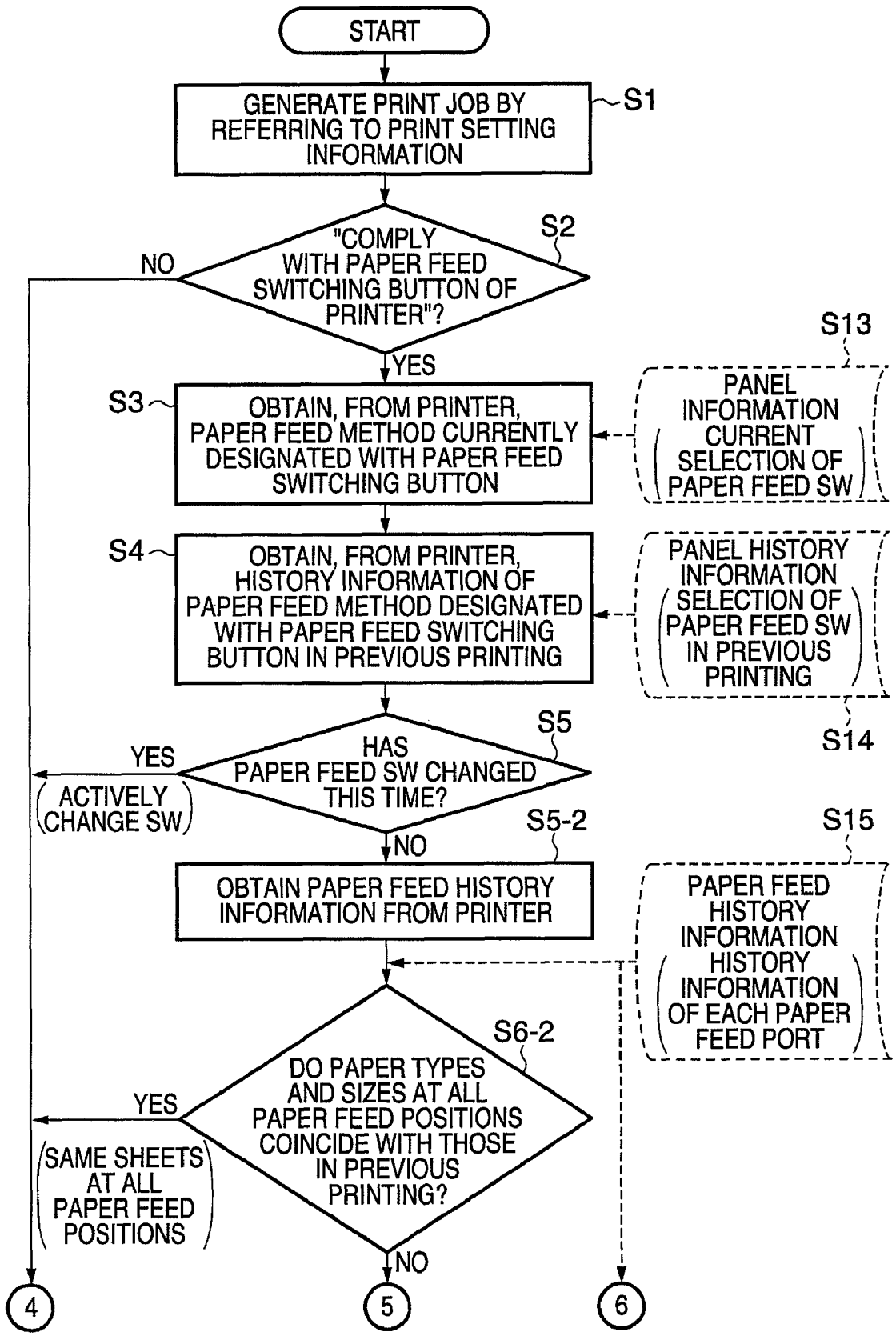
FIGS. 10A and 10B are flowcharts showing a print data transfer process according to the second embodiment of the present invention.
Figure 10B:
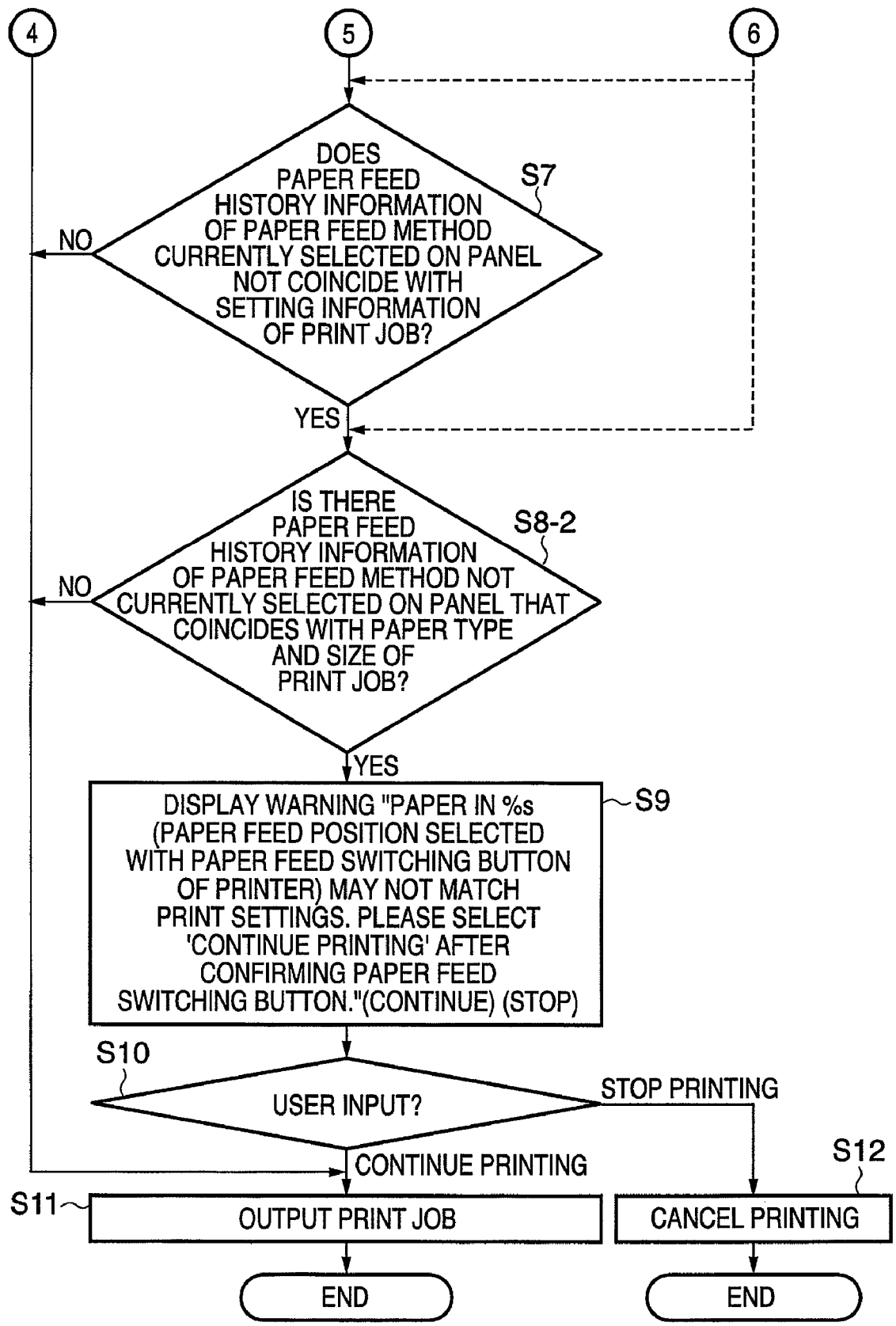

FIGS. 10A and 10B are flowcharts showing a print data transfer process according to the second embodiment. This sequence is implemented mainly by a bidirectional communication control unit 2-9 and status display unit 6-2 in a printer driver (host) 2-8. The contents of the flowcharts in FIGS. 10A and 10B showing the process of the second embodiment are different in only the following steps from those of the flowcharts in FIGS. 9A and 9B in the first embodiment, and a detailed description of this sequence will not be repeated.

(1) In step S6-2, unlike step S6-1, the printer driver 2-8 determines whether paper types and paper sizes at all the paper feed positions coincide with those in previous printing.

(2) In step S8-2, unlike step S8-1, the printer driver 2-8 determines whether paper feed history information of a paper feed method not currently selected on the panel contains a paper type and size coincident with those of the print job.

As described above, the second embodiment is different from the first embodiment in that no user information is subjected to determination in both steps S6-2 and S8-2. This configuration decreases the number of items to be compared and thus reduces the process load in comparison with the first embodiment. Even if the user changes, it can be determined that an erroneous paper feed unit is highly likely to be selected when history information of a paper feed unit for use in a target print job does not correspond to the paper size and paper type of the target print job, and history information of a paper feed unit not for use in the target print job contains a paper size and paper type which correspond to those of the target print job. For this reason, the determination precision does not greatly decrease from that in the first embodiment.

Third Embodiment

The third embodiment is related to a configuration in which print data contains only print user name information, and paper feed unit history information contains only information on the previous print user names of all selectable paper feed units. The third embodiment is different from the first embodiment in that only the user name is used to collate paper information. A description of FIG. 8 is common to that in the first embodiment, and will not be repeated.

In FIG. 7C, a history storage unit 6-10 stores information "user name of a previous print user" paired with each paper feed unit. In the example of FIG. 7C, the history storage unit 6-10 stores a history of printing by user A using the auto sheet feeder, by user B using the upper cassette, and by user B using the lower cassette.

Figure 11B:
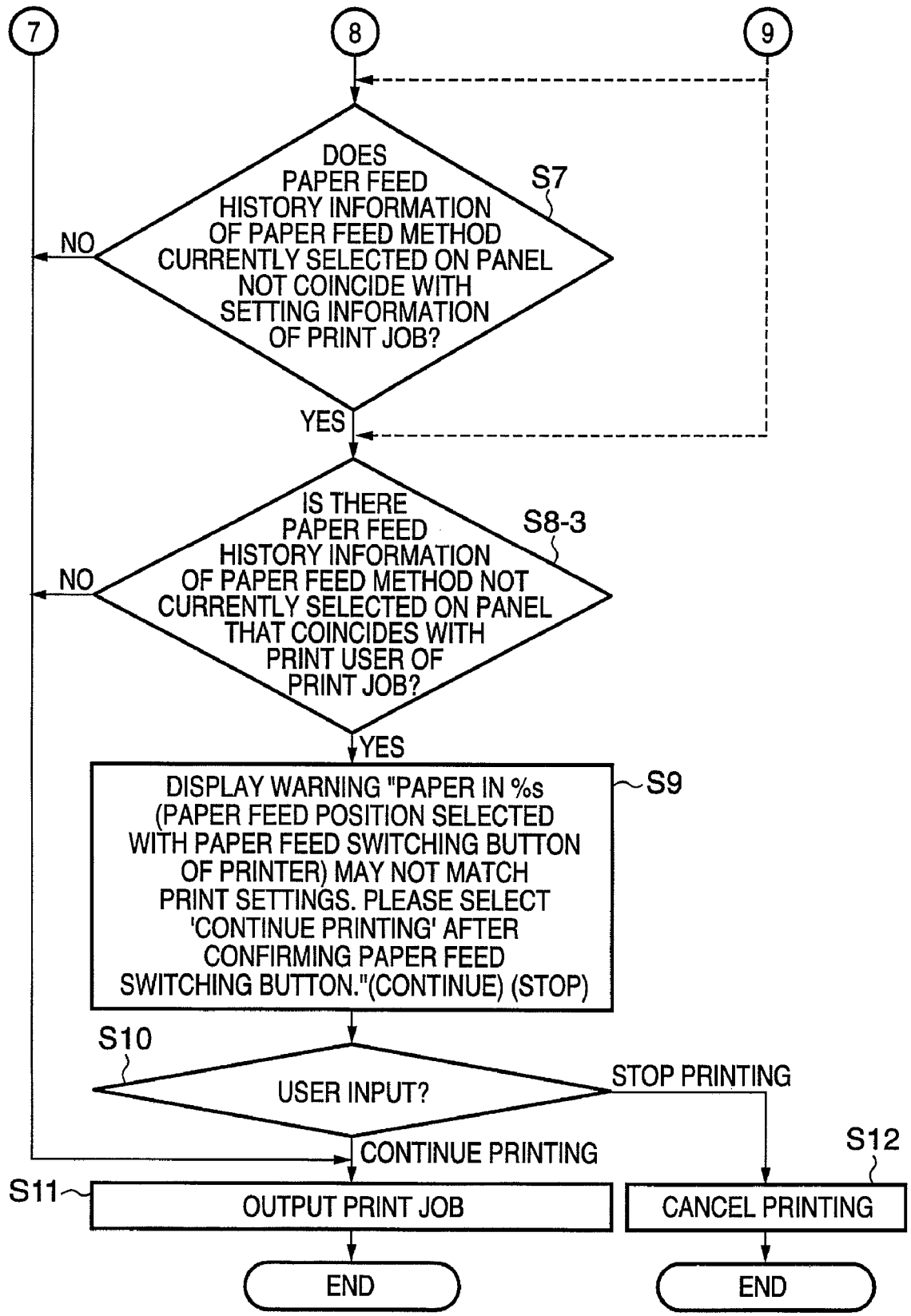

FIGS. 11A and 11B are flowcharts showing a print data transfer process according to the third embodiment. This sequence is implemented mainly by a bidirectional communication control unit 2-9 and status display unit 6-2 in a printer driver (host) 2-8. The contents of the flowcharts in FIGS. 11A and 11B showing the process of the third embodiment are different in only the following steps from those of the flowcharts in FIGS. 9A and 9B in the first embodiment, and a detailed description of this sequence will not be repeated.

(1) In step S6-3, unlike step S6-1, the printer driver 2-8 determines whether previous print user names at all the paper feed positions coincide with those in previous printing.

(2) In step S8-3, unlike step S8-1, the printer driver 2-8 determines whether paper feed history information of a paper feed method not currently selected on the panel contains a user name coincident with that of the print job.

As described above, the third embodiment is different from the first embodiment in that only user information is subjected to determination in both steps S6-3 and S8-3. This configuration decreases the number of items to be compared and thus reduces the process load in comparison with the first and second embodiments. Even if paper information changes, it can be determined that an erroneous paper feed unit is highly likely to be selected when history information of a paper feed unit for use in a target print job does not correspond to the user of the target print job, and history information of a paper feed unit not for use in the target print job contains user information which corresponds to the user of the target print job. This is because, when the same paper feed unit is used, selection of the paper feed unit need not be switched every printing, and it is considered that the user generally selects one paper feed unit. Thus, the determination precision does not greatly decrease from that in the first and second embodiments.

In this manner, when a printer with a plurality of paper feed units is to print, the probability at which an erroneous paper feed unit is designated is determined on the basis of the paper settings of a current print job and the paper setting history of each paper feed unit. When the probability is high, the user is warned.

As described above, according to the present invention, when the user performs a printing operation to a printer with a plurality of paper feed units by an erroneous paper feed method not intended for a desired print result, a warning can be properly output in accordance with the printer status to avoid an erroneous printing operation. Hence, a beneficial printing environment can be freely established.

Modifications (1) According to the procedures in FIGS. 9 to 11, when a paper feed unit for use in a target print job complies with a selection (paper feed switching button of the printer) in the printer, processes in step S3 and subsequent steps are executed. However, even if a paper feed unit for use in a target print job does not comply with a selection in the printer, it may be determined whether the history of settings corresponding to paper feed unit settings contained in the target print job is stored in association with a paper feed unit other than one used for the target print job. This determination is made instead of steps S8-2 and S8-3. In this case, steps S2 to S5 are skipped. If it is determined that the history of settings corresponding to paper feed unit settings contained in the target print job is stored in association with a paper feed unit other than one used for the target print job, the process branches to warning display in step S9. In step S7, the determination may be desirably made by replacing "paper feed method currently selected on the panel" with "paper feed method used in the target print job", i.e., a paper feed unit for use in the target print job.

(2) In FIG. 14, if "comply with the paper feed switching button" is set as the paper feed method in a current target print job in step S1401, panel information at this time is stored as panel history information. However, step S1401 may be skipped. In this case, panel information at this time is stored as panel history information regardless of whether the paper feed method has been selected with the paper feed switching button for a given print job.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-177295 filed on Jun. 27, 2006, which is hereby incorporated by reference herein in its entirety.

What is claimed is:

1. A data processing apparatus which outputs a print job to a printing apparatus with a plurality of paper feeders, comprising:
   a job generation unit configured to generate a print job containing current print settings as a target print job;
   a history obtaining unit configured to obtain, among print settings contained in a print job output before the target print job, a paper setting associated with a paper feeder as history information;
   a history determination unit configured to determine whether a paper setting which is contained in the history information obtained by said history obtaining unit and corresponds to a paper setting contained in the target print job is associated with a paper feeder different from a paper feeder designated by print settings contained in the target print job;
   a job control unit configured to stop or continue a print process in accordance with a user instruction when said history determination unit determines that the paper setting is associated with the different paper feeder, wherein the history information contains user information associated with a paper feeder in addition to the paper setting associated with the paper feeder; and
   a correspondence determination unit configured to determine whether either or both of a paper settings and pieces of user information which are contained in the history information obtained by said history obtaining unit correspond with each other respectively, wherein both the paper settings and the pieces of user information are associated with respective paper feeders,
   wherein when said correspondence determination unit determines that either or both of the paper settings and the pieces of user information correspond to each other, the print process continues without interrupting the print process, otherwise, said history determination unit performs determination.

2. The apparatus according to claim 1, further comprising a history storage unit configured to store, among print settings contained in a print job output to the printing apparatus, a paper setting associated with a paper feeder as history information,
   wherein said history obtaining unit obtains the history information from said history storage unit.

3. The apparatus according to claim 1, wherein the printing apparatus stores, in a history storage unit, a paper setting associated with a paper feeder as history information among print settings contained in a print job output to the printing apparatus, and
   said history obtaining unit obtains the history information from the history storage unit of the printing apparatus.

4. The apparatus according to claim 1, wherein the history information contains user information associated with a paper feeder instead of the paper setting associated with the paper feeder, and
   said history determination unit determines whether user information which is contained in the history information obtained by said history obtaining unit and corresponds to user information contained in the target print job is associated with a paper feeder different from the paper feeder designated by print settings contained in the target print job.

5. The apparatus according to claim 4, further comprising a correspondence determination unit configured to determine whether user settings which are contained in the history information and associated with respective paper feeders correspond to each other,
   wherein when said correspondence determination unit determines that the user settings correspond to each other, the print process continues without interrupting the print process, otherwise, said history determination unit performs determination.

6. The apparatus according to claim 1, wherein
   the printing apparatus comprises a selection unit configured to select a paper feeder,
   the data processing apparatus further comprises:
   a print setting unit configured to accept designation of a specific paper feeder or a paper feeder selected by the selection unit as a paper feeder used in the target print job that is one item of the print settings, and
   a selection determination unit configured to determine whether the designation by said print setting unit indicates a paper feeder selected by the selection unit of the printing apparatus, and
   when said selection determination unit determines that the designation by said print setting unit indicates the paper feeder selected by the selection unit of the printing apparatus, said history determination unit determines the paper feeder selected by the selection unit of the printing apparatus as a paper feeder designated by the print settings contained in the target print job.

7. A data processing apparatus which outputs a print job to a printing apparatus with a plurality of paper feeders, comprising:
   a job generation unit configured to generate a print job containing current print settings as a target print job;
   a history obtaining unit configured to obtain, among print settings contained in a print job output before the target print job, a paper setting associated with a paper feeder as history information;
   a history determination unit configured to determine whether a paper setting which is contained in the history information obtained by said history obtaining unit and corresponds to a paper setting contained in the target print job is associated with a paper feeder different from a paper feeder designated by print settings contained in the target print job; and
   a job control unit configured to stop or continue a print process in accordance with a user instruction when said history determination unit determines that the paper setting is associated with the different paper feeder, wherein the printing apparatus comprises a selection unit configured to select a paper feeder,
wherein the data processing apparatus further comprises
a print setting unit configured to accept designation of a specific paper feeder or a paper feeder selected by the selection unit as a paper feeder used in the target print job that is one item of the print settings, and
a selection determination unit configured to determine whether the designation by said print setting unit indicates a paper feeder selected by the selection unit of the printing apparatus, and
when said selection determination unit determines that the designation by said print setting unit indicates the paper feeder selected by the selection unit of the printing apparatus, said history determination unit determines the paper feeder selected by the selection unit of the printing apparatus as a paper feeder designated by the print settings contained in the target print job; and
a paper feeder determination unit configured to, when said selection determination unit determines that the designation by said print setting unit indicates the paper feeder selected by the selection unit of the printing apparatus, determine whether a paper setting associated with the paper feeder corresponds to a paper setting contained in the target print job,
wherein when said paper feeder determination unit determines that the paper setting associated with the paper feeder selected by the selection unit of the printing apparatus corresponds to the paper setting contained in the target print job, the print process continues without interrupting the print process, and when said paper feeder determination unit determines that the paper setting associated with the paper feeder selected by the selection unit of the printing apparatus does not correspond to the paper setting contained in the target print job, said history determination unit performs determination.

8. A print job control method in a data processing apparatus which outputs a print job to a printing apparatus with a plurality of paper feeders, comprising:
a job generation step of generating a print job containing current print settings as a target print job;
a history obtaining step of obtaining, among print settings contained in a print job output before the target print job, a paper setting associated with a paper feeder as history information;
a history determination step of determining whether a paper setting which is contained in the history information obtained in the history obtaining step and corresponds to a paper setting contained in the target print job is associated with a paper feeder different from a paper feeder designated by print settings contained in the target print job; and
a job control step of stopping or continuing a print process in accordance with a user instruction when the paper setting is determined in the history determination step to be associated with the different paper feeder; and
a correspondence determination step of determining whether either or both of a paper settings and pieces of user information which are contained in the history information obtained by said history obtaining unit correspond with each other respectively, wherein both the paper settings and the pieces of user information are associated with respective paper feeders,
wherein when said correspondence determination step determines that either or both of the paper settings and the pieces of user information correspond to each other, the print process continues without interrupting the print process, otherwise, said history determination step performs determination.

9. A non-transitory computer-readable recording medium which records a program for causing a computer to execute a method of outputting a print job to a printing apparatus with a plurality of paper feeders, the method comprising: a job generation step of generating a print job containing current print settings as a target print job; a history obtaining step of obtaining, among print settings contained in a print job output before the target print job, a paper setting associated with a paper feeder as history information; a history determination step of determining whether a paper setting which is contained in the history information obtained in the history obtaining step and correspond to a paper setting contained in the target print job is associated with a paper feeder different from a paper feeder designated by print settings contained in the target print job; a job control step of stopping or continuing a print process in accordance with a user instruction when the paper setting is determined in the history determination step to be associated with the different paper feeder; and a correspondence determination step of determining whether user settings which are contained in the history information and associated with respective paper feeders correspond to each other, wherein the history information contains user information associated with a paper feeder instead of the paper setting associated with the paper feeder, and wherein said history determination step determines whether user information which is contained in the history information obtained by said history obtaining step and corresponds to user information contained in the target print job is associated with a paper feeder different from the paper feeder designated by print settings contained in the target print job, and wherein when said correspondence determination step determines that the user settings correspond to each other, the print process continues without interrupting the print process, otherwise, said history determination step performs determination.

10. A non-transitory computer readable medium that has recorded thereon a program for causing a computer to execute a method of outputting a print job to a printing apparatus with a plurality of paper feeders, the method comprising:
a first determination step of determining whether or not a paper feeding method of a target print job is set to comply with a setting of the printing apparatus;
a history obtaining step of obtaining history information associated with the paper feeders, which contains paper information of respective feeders when it is determined that the paper feeding method of the target job complies with the setting of the printing apparatus;
a second determination step of determining whether or not the paper information contained in the history information of a selected paper feeder selected by the printing apparatus, which is obtained by said history obtaining step is coincident with a setting for paper included in the target print job; and
a job control step of stopping or continuing processing for the target print job in response to an instruction by a user when the paper information contained in the history information of a selected paper feeder selected by the printing apparatus is determined not to be coincident with the setting for paper included in the target print job by said second determination step.

11. A non-transitory computer readable medium that has recorded thereon a program for causing a computer to execute a method of outputting a print job to a printing apparatus with a plurality of paper feeder, the method comprising:

a first determination step of determining whether or not a paper feeding method of a target print job is set to comply with a setting of the printing apparatus;

a history obtaining step of obtaining history information associated with the paper feeders, which contains paper information of respective feeders when it is determined that the paper feeding method of the target job complies with the setting of the printing apparatus;

a second determination step of determining whether or not the paper information contained in the history information of a non-selected paper feeder that is not selected by the printing apparatus, which is obtained by said history obtaining step is coincident with a setting for paper included in the target print job; and a job control step of stopping or continuing processing for the target print job in response to an instruction by a user when the paper information contained in the history information of the non-selected paper feeder is determined to be coincident with the setting for paper included in the target print job by said second determination step.

* * * * *